US012731192B2

(12) United States Patent
Saxena

(10) Patent No.: US 12,731,192 B2
(45) Date of Patent: Sep. 8, 2026

(54) SYSTEMS AND METHODS FOR GENERATING COMPUTERIZED DATABASES

(71) Applicant: Visak Financial Technology Pte. Ltd., Jurong East (SG)

(72) Inventor: Rajiv Saxena, Jurong East (SG)

(73) Assignee: VISAK FINANCIAL TECHNOLOGY PTE. LTD., Singapore (SG)

(*) Notice: Subject to any disclaimer, the term of this patent is extended or adjusted under 35 U.S.C. 154(b) by 401 days.

(21) Appl. No.: 17/992,723

(22) Filed: Nov. 22, 2022

(65) Prior Publication Data

US 2023/0162291 A1 May 25, 2023

Related U.S. Application Data

(60) Provisional application No. 63/282,648, filed on Nov. 23, 2021.

(51) Int. Cl.
*G06Q 40/12* (2023.01)

(52) U.S. Cl.
CPC .................................... *G06Q 40/12* (2013.12)

(58) Field of Classification Search
None
See application file for complete search history.

(56) References Cited

U.S. PATENT DOCUMENTS 6,186,396 B1 * 2/2001 Crandall, Jr. ......... G07F 19/205 235/379
6,375,466 B1 * 4/2002 Juranovic ............. G09B 19/18 434/129
6,493,690 B2 * 12/2002 Bertrand ................ G06F 9/453 706/45
10,147,093 B2 * 12/2018 Yang ...................... G06Q 20/02
10,346,675 B1 * 7/2019 Nagalla ................ G06V 40/172
10,354,126 B1 * 7/2019 Nagalla ............ G06Q 20/40145
2002/0062249 A1 * 5/2002 Iannacci ................ G06Q 30/06 705/14.1
2002/0065752 A1 * 5/2002 Lewis .................... G06Q 30/04 705/35
2002/0090595 A1 * 7/2002 Hubbell ................... G09B 7/02 434/118
2002/0091991 A1 * 7/2002 Castro ....................... G06F 9/06 717/106

(Continued)

FOREIGN PATENT DOCUMENTS

CA 2604407 A1 * 10/2006 ......... G06Q 10/1053
JP 2004264940 A * 9/2004

*Primary Examiner* — Fateh M Obaid
(74) *Attorney, Agent, or Firm* — Norton Rose Fulbright US LLP

(57) ABSTRACT

Embodiments described herein relate to systems and methods for electrical computers, digital processing, and visual display that involve generation, storage, retrieval, and visualizations of data relating to a computerized cash flow ledger entries database. Embodiments described herein relate to systems and methods for electrical computers, digital processing, and visual display that involve modifying databases to create a new computerized database containing only data relating to cash transactions and to generate reports, including a Statement of Cash Flows by the Direct Method.

18 Claims, 10 Drawing Sheets

| PROCESS STEP ID | PROCESS STEP DESCRIPTION | NEXT STEP ID | CONNECTOR LABEL | SHAPE TYPE |
|---|---|---|---|---|
| P69050 | START SUBPROCESS | P69100 | | START |
| P69100 | FIND ALL ORIGINAL DOCUMENT NUMBERS TO WHICH RECEIPT/PAYMENT IS APPLIED | P69200 | | PROCESS |
| P69200 | ARE THERE ANY UNPROCESSED DOCUMENT NOS. TO WHICH RECEIPT/PAYMENT IS APPLIED? | P69300, P75000 | YES, NO | DECISION |
| P69300 | READ NEXT UNPROCESSED DOCUMENT NO | P69400 | | PROCESS |
| P69400 | CALCULATE MULTIPLICATION FACTOR=(APPLIED AMOUNT/TOTAL A/R OR A/P AMOUNT) | P69500 | | PROCESS |
| P69500 | ARE THERE ANY UNPROCESSED G/L ENTRY LINES? | P69600, P69200 | YES, NO | DECISION |
| P69600 | READ NEXT UNPROCESSED LINE FROM G/L ENTRY | P69700 | | PROCESS |
| P69700 | DOES LINE ENTRY HAVE SOURCE CUSTOMER OR VENDOR? | P69800, P69300 | YES, NO | DECISION |
| P69800 | MULTIPLY G/L ENTRY LINE AMOUNT BY MULTIPLICATION FACTOR | P69000 | | PROCESS |
| P69000 | ADD NEW G/L ENTRY LINE TO CASH FLOW DATABASE | P69500 | | PROCESS |
| P75000 | END SUBPROCESS | | | END |

(56) References Cited

U.S. PATENT DOCUMENTS

| | | | | |
|---|---|---|---|---|
| 2003/0041040 | A1* | 2/2003 | Bertrand | G09B 7/04 706/12 |
| 2005/0055289 | A1* | 3/2005 | Mehldahl | G06Q 40/12 705/30 |
| 2005/0240467 | A1* | 10/2005 | Eckart | G06Q 40/12 705/30 |
| 2006/0167771 | A1* | 7/2006 | Meldahl | G06Q 40/06 705/30 |
| 2015/0178726 | A1* | 6/2015 | Wen | G06Q 20/40 705/44 |
| 2018/0246983 | A1* | 8/2018 | Rathod | G06F 16/972 |
| 2019/0080399 | A1* | 3/2019 | Jain | G06Q 40/03 |
| 2019/0114334 | A1* | 4/2019 | Gunther | G06F 16/27 |
| 2020/0026770 | A1* | 1/2020 | Li | G06F 40/30 |
| 2020/0027169 | A1* | 1/2020 | Valencia | H04L 9/3231 |
| 2021/0027226 | A1* | 1/2021 | Mohun | G06Q 10/06312 |
| 2021/0201328 | A1* | 7/2021 | Gunther | H04L 9/3073 |
| 2022/0036302 | A1* | 2/2022 | Cella | H04L 67/1097 |
| 2022/0108262 | A1* | 4/2022 | Cella | G05B 17/02 |
| 2023/0176557 | A1* | 6/2023 | Cella | G05B 13/048 700/117 |
| 2024/0412298 | A1* | 12/2024 | Adear | G06Q 40/123 |

* cited by examiner

FIG. 7

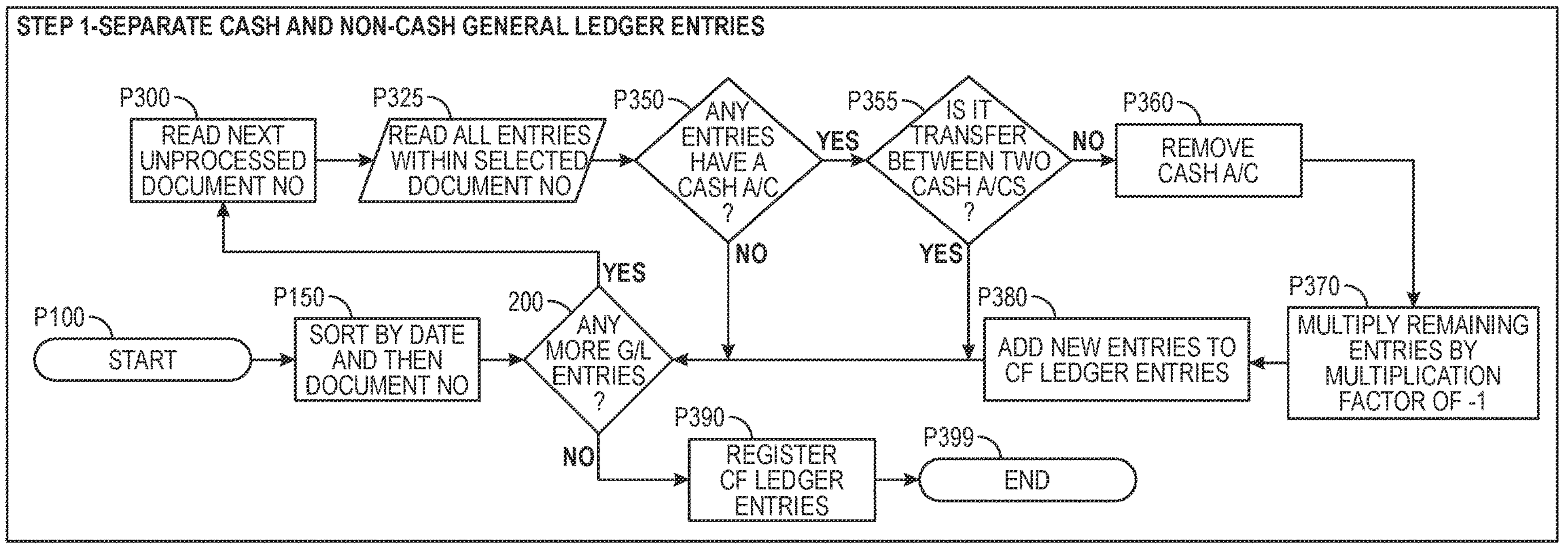

| PROCESS STEP ID | PROCESS STEP DESCRIPTION | NEXT STEP ID | CONNECTOR LABEL | SHAPE TYPE |
|---|---|---|---|---|
| P100 | START | P150 | | START |
| P150 | SORT BY DATE AND THEN DOCUMENT NO. | P200 | | PROCESS |
| P200 | ANY MORE G/L ENTRIES? | P300, P390 | YES, NO | DECISION |
| P300 | READ NEXT UNPROCESSED DOCUMENT NO | P325 | | PROCESS |
| P325 | READ ALL ENTRIES WITHIN SELECTED DOCUMENT NO. | P350 | | DATA |
| P350 | ANY ENTRIES HAVE A CASH A/C? | P355, P200 | YES, NO | DECISION |
| P355 | IS IT TRANSFER BETWEEN TWO CASH A/CS? | P200, P360 | YES, NO | DECISION |
| P360 | REMOVE CASH A/C | P370 | | PROCESS |
| P370 | MULTIPLY REMAINING ENTRIES BY MULTIPLICATION FACTOR OF -1 | P380 | | PROCESS |
| P380 | ADD NEW ENTRIES TO CF LEDGER ENTRIES | P200 | | PROCESS |
| P390 | REGISTER CF LEDGER ENTRIES | P399 | | PROCESS |
| P399 | END | | | |

FIG. 8

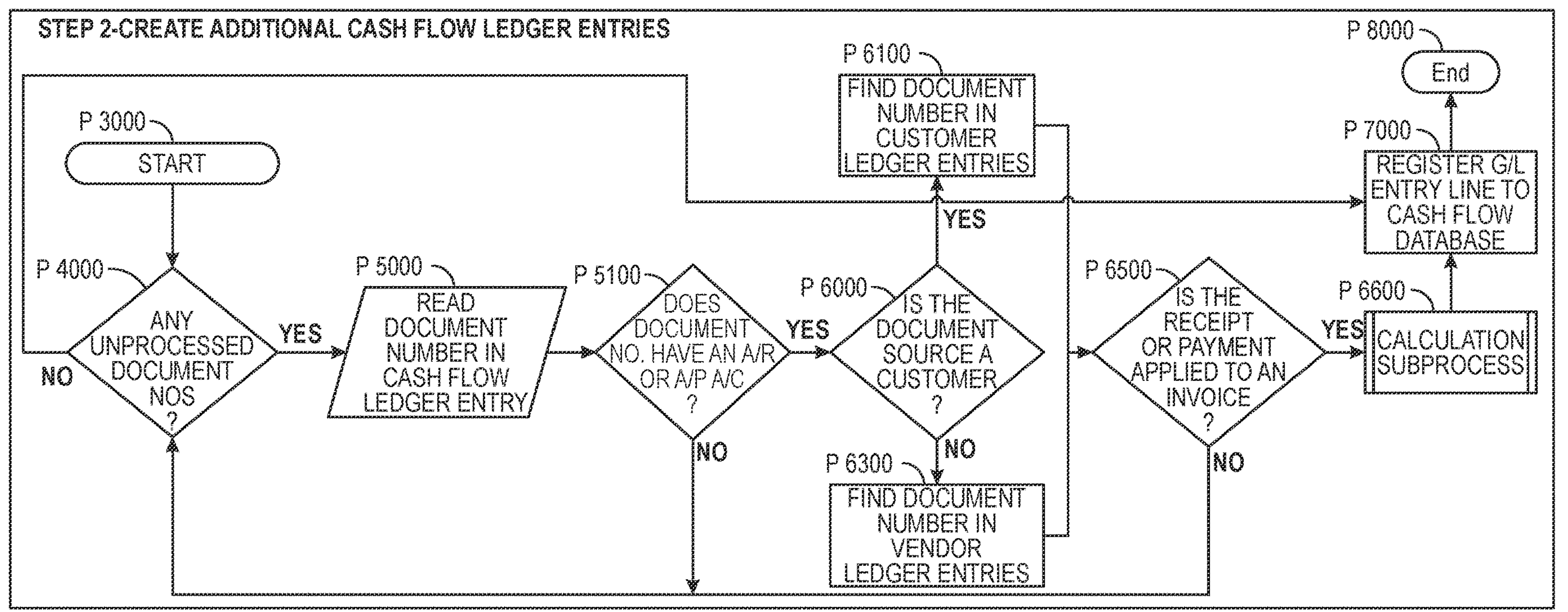

| PROCESS STEP ID | PROCESS STEP DESCRIPTION | NEXT STEP ID | CONNECTOR LABEL | SHAPE TYPE |
|---|---|---|---|---|
| P3000 | START | P4000 | | START |
| P4000 | ANY UNPROCESSED DOCUMENT NOS.? | P5000, P7000 | YES, NO | DECISION |
| P5000 | READ DOCUMENT NUMBER IN CASH FLOW LEDGER ENTRY | P5100 | | DATA |
| P5100 | DOES DOCUMENT NO. HAVE AN A/R OR A/P A/C? | P6000, P4000 | YES, NO | DECISION |
| P6000 | IS THE DOCUMENT SOURCE A CUSTOMER? | P6100, P6300 | YES, NO | DECISION |
| P6100 | FIND DOCUMENT NUMBER IN CUSTOMER LEDGER ENTRIES | P6500 | | PROCESS |
| P6300 | FIND DOCUMENT NUMBER IN VENDOR LEDGER ENTRIES | P6500 | | PROCESS |
| P6500 | IS THE RECEIPT OR PAYMENT APPLIED TO AN INVOICE? | P6600, P4000 | YES, NO | DECISION |
| P6600 | CALCULATION SUBPROCESS | P7000 | | SUBPROCESS |
| P7000 | REGISTER G/L ENTRY LINE TO CASH FLOW DATABASE | P8000 | | PROCESS |
| P8000 | END | | | END |

FIG. 9

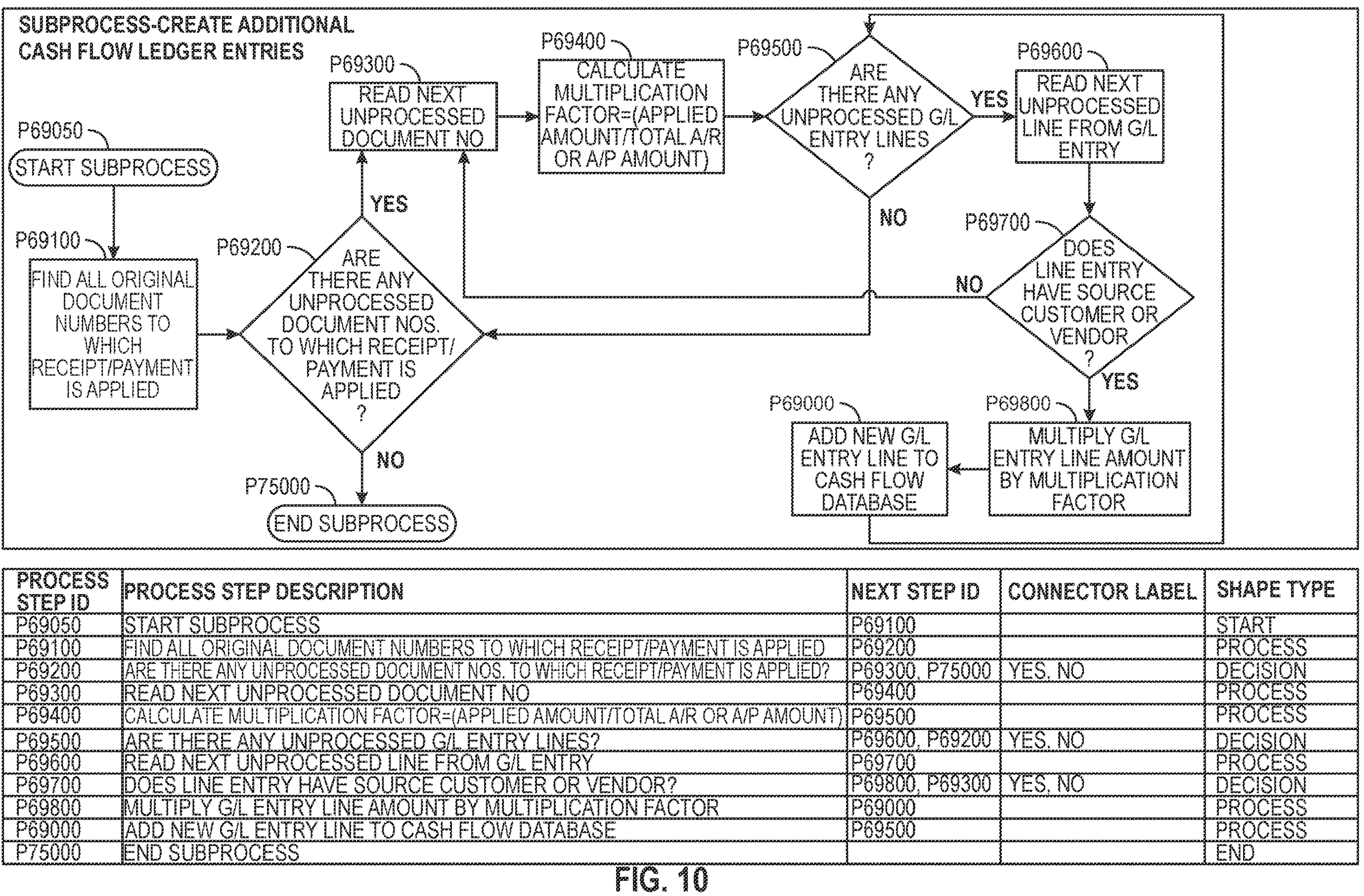

| PROCESS STEP ID | PROCESS STEP DESCRIPTION | NEXT STEP ID | CONNECTOR LABEL | SHAPE TYPE |
|---|---|---|---|---|
| P69050 | START SUBPROCESS | P69100 | | START |
| P69100 | FIND ALL ORIGINAL DOCUMENT NUMBERS TO WHICH RECEIPT/PAYMENT IS APPLIED | P69200 | | PROCESS |
| P69200 | ARE THERE ANY UNPROCESSED DOCUMENT NOS. TO WHICH RECEIPT/PAYMENT IS APPLIED? | P69300, P75000 | YES, NO | DECISION |
| P69300 | READ NEXT UNPROCESSED DOCUMENT NO | P69400 | | PROCESS |
| P69400 | CALCULATE MULTIPLICATION FACTOR=(APPLIED AMOUNT/TOTAL A/R OR A/P AMOUNT) | P69500 | | PROCESS |
| P69500 | ARE THERE ANY UNPROCESSED G/L ENTRY LINES? | P69600, P69200 | YES, NO | DECISION |
| P69600 | READ NEXT UNPROCESSED LINE FROM G/L ENTRY | P69700 | | PROCESS |
| P69700 | DOES LINE ENTRY HAVE SOURCE CUSTOMER OR VENDOR? | P69800, P69300 | YES, NO | DECISION |
| P69800 | MULTIPLY G/L ENTRY LINE AMOUNT BY MULTIPLICATION FACTOR | P69000 | | PROCESS |
| P69000 | ADD NEW G/L ENTRY LINE TO CASH FLOW DATABASE | P69500 | | PROCESS |
| P75000 | END SUBPROCESS | | | END |

FIG. 10

SYSTEMS AND METHODS FOR GENERATING COMPUTERIZED DATABASES

CROSS-REFERENCE TO RELATED APPLICATIONS

The present application claims the benefit of U.S. Provisional Patent Application No. 63/282,648, filed Nov. 23, 2021, the disclosure of which is hereby incorporated by reference in its entirety.

FIELD

The improvements generally relate to the field of electrical computers, digital processing systems, and visual display systems.

INTRODUCTION

Embodiments described herein relate to systems and methods for electrical computers, digital processing, and visual display that involve generation, storage, retrieval, and visualizations of data relating to accrual accounting records. Embodiments described herein relate to systems and methods for electrical computers, digital processing, and visual display that involve modifying databases to create a new computerized database containing only data relating to cash transactions. The new computerized database is accessible by a client device having an interface and/or a cloud server to produce different cash accounting reports, including a statement of cash flows by the direct method. Embodiments described herein relate to systems and methods for processing large databases with thousand or millions of records, and generating improved interfaces with visualizations of the processed data.

SUMMARY

In accordance with an aspect, there is provided systems and methods for generating computerized databases.

In accordance with another aspect, there is provided a system for electrical computers, digital processing, and visual display, the system comprising a non-transitory memory storing instructions, and a hardware processor for generation and storage of a computerized cash flow ledger entries database, the hardware processor further for retrieval and visualizations of data from the cash flow ledger entries database to implement a statement of cash flows by a direct process.

In some embodiments, the memory stores general ledger entries and the hardware processor automatically extracts cash related entries from the general ledger entries, modifies the extracted cash related entries from the general ledger entries, creates cash flow ledger entries from the modified cash related entries, and populates the cash flow ledger entries database with the cash flow ledger entries.

In some embodiments, the memory stores customer ledger entries and vendor ledger entries, and wherein the hardware processor creates additional cash flow ledger entries by extracting and modifying data from the customer ledger entries, the vendor ledger entries, and the general ledger entries, wherein the hardware processor populates the cash flow ledger entries database with the additional cash flow ledger entries.

In accordance with another aspect, there is provided a method for electrical computers, digital processing, and visual display, the method comprising, using a hardware processor for generation and storage of a computerized cash flow ledger entries database, further for retrieval and visualizations of data from the cash flow ledger entries database to implement a statement of cash flows by a direct process.

In some embodiments, the method involves: storing general ledger entries in the memory, and using the hardware processor to automatically extract cash related entries from the general ledger entries, modify the extracted cash related entries from the general ledger entries, create cash flow ledger entries from the modified cash related entries, and populate the cash flow ledger entries database with the cash flow ledger entries.

In some embodiments, the method involves: storing customer ledger entries and vendor ledger entries in the memory, and using the hardware processor to create additional cash flow ledger entries by extracting and modifying data from the customer ledger entries, the vendor ledger entries, and the general ledger entries, and using the hardware processor to populate the cash flow ledger entries database with the additional cash flow ledger entries.

In accordance with another aspect, there is provided a system for electrical computers, digital processing, and visual display, the system comprising a non-transitory memory storing instructions, and a hardware processor for modifying databases to create a new computerized database containing only data relating to cash transactions, wherein the new computerized database is accessible by a client device having an interface and a cloud server to produce different cash accounting reports, including a statement of cash flows by the direct method.

In accordance with another aspect, there is provided a method for electrical computers, digital processing, and visual display, the method comprising modifying databases to create a new computerized database containing only data relating to cash transactions, wherein the new computerized database is accessible by a client device having an interface and a cloud server to produce different cash accounting reports, including a statement of cash flows by the direct method.

Many further features and combinations thereof concerning embodiments described herein will appear to those skilled in the art following a reading of the instant disclosure.

DESCRIPTION OF THE FIGURES

FIG. 7 shows an overview of accrual accounting as compared with cash basis accounting;

FIG. 8 shows a summary of the sub-process of FIG. 3;

FIG. 9 shows a summary of the sub-process of FIG. 4; and

FIG. 10 shows a summary of the sub-process of FIG. 5.

DETAILED DESCRIPTION

Figure 1:
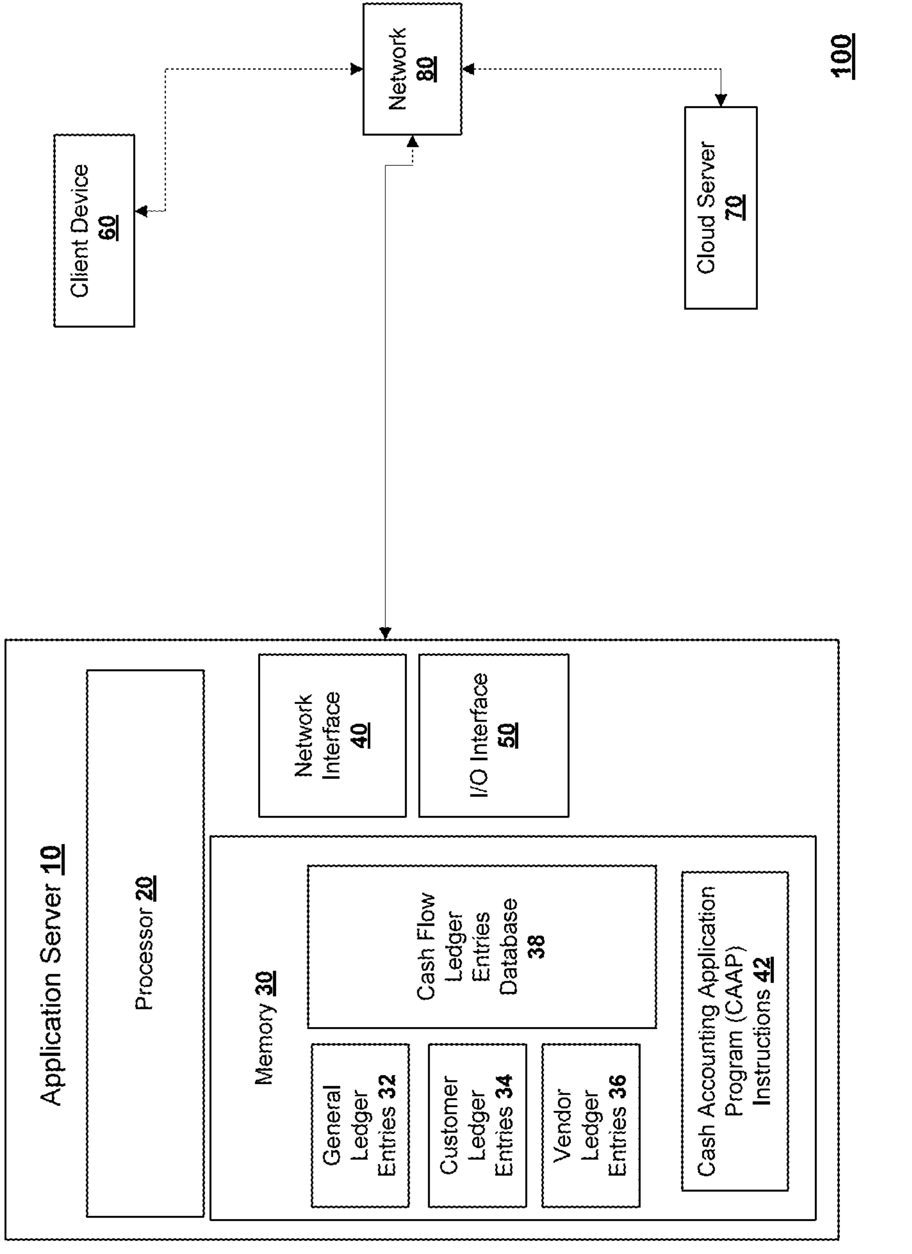
FIG. 1 shows an example system for generating computerized databases.

Embodiments described herein relate to systems and methods for electrical computers, digital processing, and visual display that involve generation, storage, retrieval, and visualizations of data relating to accrual accounting records. Embodiments described herein relate to systems and methods for electrical computers, digital processing, and visual display that involve modifying databases to create a new computerized database. Embodiments described herein relate to systems and methods for processing large databases with thousand or millions of records, and generating improved interfaces with visualizations of the processed data.

There are two methods of accounting which are used by businesses and organizations to track their performance, calculate their taxes and plan for their future. These are methods are (1) accrual accounting; and (2) cash basis accounting.

The cash basis of accounting is the simpler of the two methods. The cash basis of accounting records economic events only when cash is received or paid. Thus, revenue and expense entries are recorded in a database only when cash is received or paid.

The accrual basis of accounting records economic events when they occur which may be before cash changes hands. Thus, revenue entries are recorded in a database when it is earned and expense entries are recorded in a database when they are incurred.

Accrual basis of accounting is required to follow certain rules and regulations to be in accordance with Generally Accepted Accounting Principles (GAAP). For example, in the United States of America, the Financial Accounting Standards Board (FASB) and the Securities and Exchange Commission set out GAAP. As another example, the International Accounting Standards Board (IASB) specifies the GAAP for many other countries.

Figure 7:
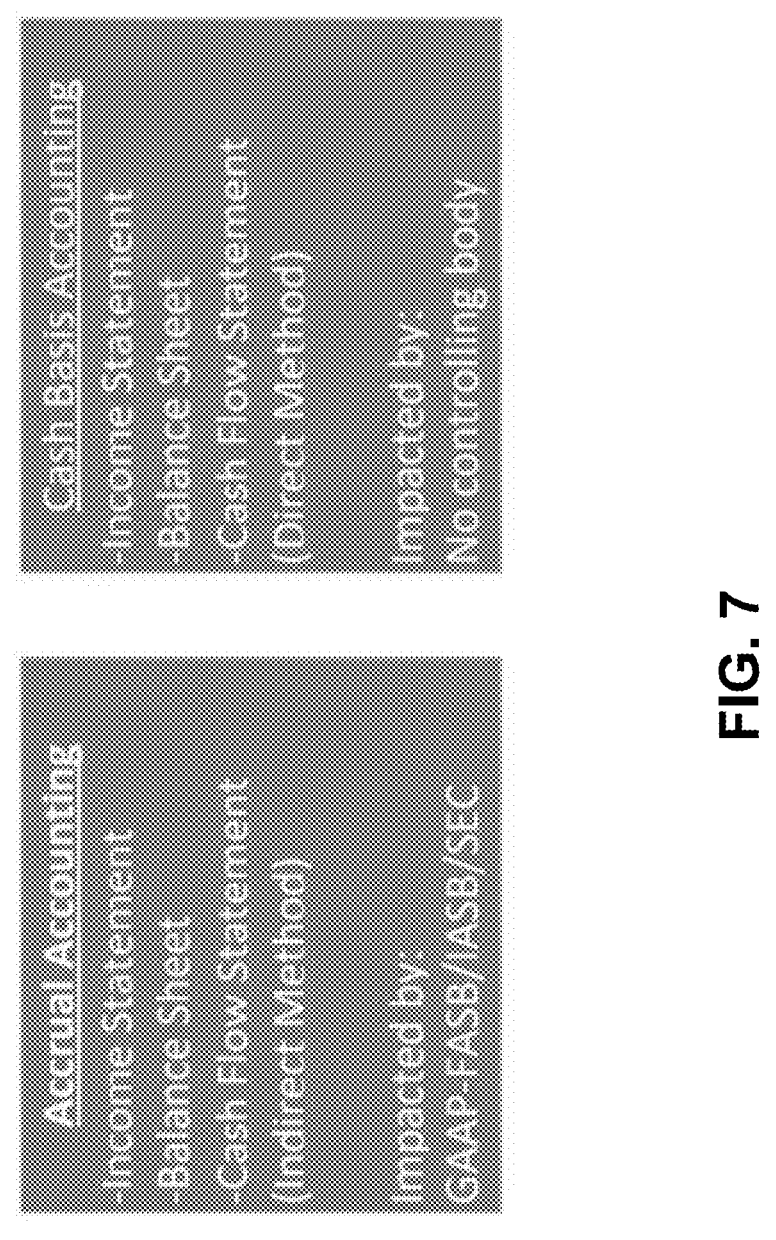

Cash basis accounting is not required to follow any prescribed rules and regulations and is not considered to be in accordance with GAAP. An overview is given in FIG. 7.

The accrual basis of accounting and cash basis of accounting are two distinct methods of accounting. If a business or organization desires information from the both the accrual basis of accounts and the cash basis of accounts, it is required to maintain two distinct 'books' or sets of accounts. This requirement to maintain two distinct 'books' of accounts is problematic as it requires double the effort and because it is impractical to keep the two 'books' of accounts of synchronized due to the number of transactions. Errors invariably occur as the accounting entries may be reflected with different amounts and be charged to different accounts between the two sets of books. Also, a reversal or error correction in one set of 'books' may not be reflected in the other.

Some of the produced financial statements from these two methods are shown in the following table.

| Accrual Basis | Cash Basis |
|---|---|
| Income Statement-Accrual Basis | Income Statement-Cash Basis |
| Balance Sheet-Accrual Basis | Balance Sheet-Cash Basis |
| Cash Flow Statement-Indirect Method (CFS-Indirect Method) | Cash Flow Statement-Direct Method (CFS-Direct Method) |

The financial statements derived from accrual basis and cash basis, even though they have similar names, give different measures of financial performance for an entity. Accrual basis accounts gives a more complete and long-term view of financial performance. Cash basis accounts focus more on the liquidity of the business and the ability to meet obligations in the short term.

Embodiments described herein relate to systems and methods for electrical computers, digital processing, and visual display that involve a cash flow statement by direct method (CFS by Direct Method) including the generation of a computerized database and an interface for generating reports that are considered more informative and useful when compared to cash flow statement by indirect method (CFS by Indirect Method). Sample cash flow statements of both types are shown in the following example tables:

ANNEXURE 1
COMPANY M
CONSOLIDATED STATEMENT OF CASHFLOWS
(DIRECT METHOD)
FOR THE YEAR ENDED DEC. 31, 19X1
lncrease/(Decrease) in Cash and Cash Equivalents

| | |
|---|---|
| Cash flows from operating activities: | |
| Cash received from customers | $ 13,850 |
| Cash paid to suppliers and employees | (12,000) |
| Dividend received from affiliate | 20 |
| Interest received | 55 |
| Interest paid (net of amount capitalized) | (220) |
| Income taxes paid | (325) |
| Insurance proceeds received | 15 |
| Cash paid to settle lawsuit for patent infringementNet | (30) |
| cash provided by operating activities | $ 1,365 |
| Cash flows from investing activities: | |
| Proceeds from sale of facility | 600 |
| Payment received on note for sale of plant | 150 |
| Capital expenditures | (1,000) |
| Payment for purchase of Company S, net of cash acquiredNet | (925) |
| cash used in investing activities | (1,175) |
| Cash flows from financing activities: | |
| Net borrowings under line-of-credit agreement | 300 |
| Principal payments under capital lease obligation | (125) |
| Proceeds from issuance of long-term debt | 400 |
| Proceeds from issuance of common stock | 500 |
| Dividends paid | (200) |
| Net cash provided by financing activities | 875 |
| Net increase in cash and cash equivalents | 1,065 |
| Cash and cash equivalents at beginning of year | 600 |
| Cash and cash equivalents at end of year | $ 1,665 |

ANNEXURE 2
COMPANY M
CONSOLIDATED STATEMENT OF CASHFLOWS
(INDIRECT METHOD)
FOR THE YEAR ENDED DEC. 31, 19X1
Increase (Decrease) in Cash and Cash Equivalents

| | |
|---|---|
| Cash flows from operating activities: | |
| Net income | $ 760 |
| Adjustments to reconcile net income to net cash provided by operating activities: | |
| Depreciation and amortization | |
| $445 Provision for losses on accounts receivable | 200 |
| Gain on sale of facility | (80) |

-continued

ANNEXURE 2
COMPANY M
CONSOLIDATED STATEMENT OF CASHFLOWS
(INDIRECT METHOD)
FOR THE YEAR ENDED DEC. 31, 19X1
Increase (Decrease) in Cash and Cash Equivalents

| | |
|---|---|
| Undistributed earnings of affiliate | (25) |
| Payment received on installment note receivable for sale of inventory | 100 |
| Change in assets and liabilities net of effects from purchase of Company S: | |
| Increase in accounts receivable | (215) |
| Decrease in inventory | 205 |
| Increase in prepaid expenses | (25) |
| Decrease in accounts payable and accrued expenses | (250) |
| Increase in interest and income taxes payable | 50 |
| Increase in deferred taxes | 150 |
| Increase in other liabilities | 50 |
| Total adjustments | 605 |
| Net cash provided by operating activities | 1,365 |
| Cash flows from investing activities: | |
| Proceeds from sale of facility | 600 |
| Payment received on note for sale of plant | 150 |
| Capital expenditures | (1,000) |
| Payment for purchase of Company S, net of cash acquiredNet | (925) |
| cash used in investing activities | (1,175) |
| Cash flows from financing activities: | |
| Net borrowings under line-of-credit agreement | 300 |
| Principal payments under capital lease obligation | (125) |
| Proceeds from issuance of long-term debt | 400 |
| Proceeds from issuance of common stock | 500 |
| Dividends paid | (200) |
| Net cash provided by financing activities | 875 |
| Net increase in cash and cash equivalents | 1,065 |
| Cash and cash equivalents at beginning of year | 600 |
| Cash and cash equivalents at end of year | $ 1,665 |

FIG. 1 shows an example system 100 for generating computerized databases, such as a cash flow ledger entries database 38. The system 100 involves electrical computers, digital processing, and visual display. The system 100 has an application server 10 with a non-transitory memory 30 storing cash accounting application program (CAAP) instructions 42 for a cash accounting application program (CAAP), and a hardware processor 20 for the automatic generation and storage of a computerized cash flow ledger entries database 38. The hardware processor 20 is configured for automatic retrieval and visualizations of data from the cash flow ledger entries database 38 to implement a CFS by Direct Method.

In some embodiments, the memory 30 stores general ledger entries 32. The hardware processor 20 automatically extracts cash related entries from the general ledger entries 32, modifies the extracted cash related entries from the general ledger entries 32, creates cash flow ledger entries from the modified cash related entries, and populates the cash flow ledger entries database 38 with the cash flow ledger entries. In some embodiments, the memory 30 stores customer ledger entries 34 and vendor ledger entries 36. The hardware processor 20 creates additional cash flow ledger entries by extracting and modifying data from the customer ledger entries 34, the vendor ledger entries 36, and the general ledger entries 32. The hardware processor 20 populates the cash flow ledger entries database 38 with the additional cash flow ledger entries.

The hardware processor 20 reads databases to create a new cash flow ledger entries database 38 containing only data relating to cash transactions. The new cash flow ledger entries database 38 is accessible by a client device 60 having an interface and a cloud server 70 to produce different cash accounting reports, including a CFS by the Direct Method. The hardware processor 20 can transform or modify data using code to create the new cash flow ledger entries database 38. The code (e.g., the CAAP instructions 42) controls the transformation to protect data integrity by indicating how data read from different database sources is modified for the new cash flow ledger entries database 38. The hardware processor 20 can store a database source identifier for data elements stored therein to support traceability.

Accordingly, the system 100 involves electrical computers, digital processing, and visual display devices. The system 100 has an application server 10 with a non-transitory memory 30 storing instructions cash account application program (CAAP) instructions 42, and a hardware processor 20 for generation, storage, retrieval, and visualizations of data relating to cash flow ledger entries database 38. The hardware processor 20 can modify databases to create a new computerized database 38 containing only data relating to cash transactions (e.g. cash flow ledger entries). The hardware processor 20 extracts data from general ledger entries 32, customer ledger entries 34, vendor ledger entries 36 to populate and create a new computerized cash flow ledger entries database 38 containing only data relating to cash transactions (e.g. cash flow ledger entries). The new computerized cash flow ledger entries database 38 (occasionally referred to herein as the "new computerized database") is accessible by a client device 60 having an interface and a cloud server 70 to produce different cash accounting reports, including a statement of cash flows by the direct method. The server 10 can exchange data with other components using network interface 40 and I/O interface 50.

The hardware processor 20 can retrieve and transform data from general ledger entries 32, customer ledger entries 34, and vendor ledger entries 36 to create a new computerized cash flow ledger entries database 38 of cash flow ledger entries. The hardware processor 20 can identify documents or datasets from the general ledger entries 32, customer ledger entries 34, and vendor ledger entries 36 that have entries relating to cash accounts and generate new entries for the cash account entries to be added to the cash flow ledger entries database 38. The hardware processor 20 can compute and apply multiplication factors to the entries relating to cash accounts to modify the data prior to adding new entries (with the modified data) to the cash flow ledger entries database 38.

For simplicity only one application server 10 is shown but system 100 may include more application servers 10 operable by users to access remote network resources and exchange data. The application servers 10 may be the same or different types of devices. The application servers 10 has at least one processor 20, a data storage device 30 (including volatile memory or non-volatile memory or other data storage elements or a combination thereof), and at least one communication interface, such as network interface 40 and I/O interface 50. The application server 10 components may be connected in various ways including directly coupled, indirectly coupled via a network 80, and distributed over a wide geographic area and connected via a network 80.

In an embodiment, as depicted, application server 10 includes at least one processor 20, memory 30, at least one I/O interface 50, and at least one network interface 40.

Each processor 20 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 30 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 50 enables application server 10 (and its hardware processor 20) to interconnect with one or more input devices, such as a keyboard, mouse, camera, touch screen and a microphone, or with one or more output devices such as a display screen and a speaker.

Each network interface 40 enables application server 10 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Application server 10 is operable to register and authenticate users (using a login, unique identifier, and password for example) prior to providing access to applications, a local network, network resources, other networks and network security devices. Application server 10 may serve one user or multiple users.

The system 100 reads databases (e.g. general ledger entries 32, customer ledger entries 34, and vendor ledger entries 36) to create a new computerized cash flow ledger entries database 38 containing only data relating to cash transactions (e.g. cash flow ledger entries). The new computerized database (e.g., cash flow ledger entries database 38) is accessible by a client device 60 having an interface and/or a cloud server 60 via a network 80. The system 100 generates different cash accounting reports using the new computerized database, including a statement of cash flows by the direct method.

The system 100 converts accrual basis accounts to cash basis accounts automatically and quickly. Further, if there is a change in the underlying accrual basis accounts, the system 100 immediately reflects the change in the cash basis accounts. As an example, if an accrual accounting entry is reversed, the system will automatically reverse the cash flow ledger entry which had been generated from it before. As another example, if a receipt/payment is 'unapplied' from an invoice, the cash flow ledger entry which had been generated for the 'applied" receipt/payment will also be reversed. The system 100 integrates and synchronizes accrual and cash basis account data. The system 100 reduces errors and uses computing resources efficiently. A computer system and computer implemented process are essential to convert thousands or millions of accounting entries of an accounting system from an accrual basis accounts to cash basis accounts. These thousands or millions of entries may be referred to as a high volume, large volume, or substantial volume of accounting entries. An example advantage of embodiments described herein is that only the accrual basis accounts need to be to be stored in memory 30 and the cash basis accounts can be derived from the stored data on demand. This substantially reduces the amount of computer resources required to maintain the accounting system and eliminates errors between the two separate data stores of accounts.

Figure 6:
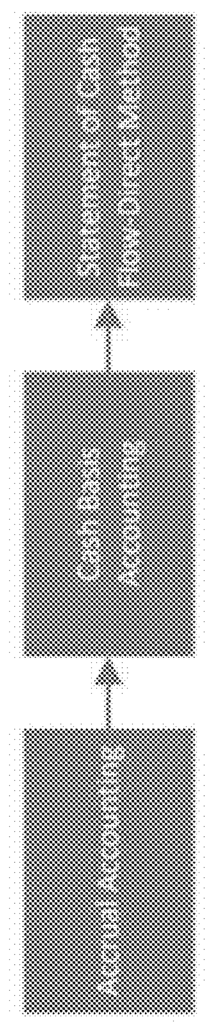
FIG. 6 shows an example method of generating a cash flow statement (CSF) by Direct Method from cash basis accounts.

The system 100 can derive a CFS statement by Direct Method from cash basis accounts. An overview is shown in FIG. 6. The hardware processor 20 can transform data from accrual accounting to data for cash basis accounting and then to data for populating the cash flow ledger entries database 38.

The system 100 enables an automatic preparation of CFS by Direct Method. The system 100 can automatically prepare the CFS by Direct Method from cash basis of accounts. Accounting practitioners, researchers, and standard setters (FASB and IASB) have long sought a practical method to prepare a CFS by Direct Method.

A CFS by Direct Method is useful to investors, lenders, management, auditors and other stakeholders, since CFS by Direct Method is easier to understand as it provides detailed information of cash receipts and disbursements. The CFS by Direct Method provides information which makes it easier to predict/estimate future cash flows (especially in sensitivity analysis). The CFS by Direct Method is helpful in comparing actual cash flow to budget as both ex-post and ex-ante cash flow information is in the same format. The CFS by Direct Method makes it easier to compare cash flow information across different companies. This information is useful to managers, investors, creditors, and analysts. For example, the CFS by Direct Method provides more helpful data than the CFS by Indirect Method. Accounting systems may not collect information about gross operating cash receipts and payments. The system 100 implements a more comprehensive and useful approach by using the direct method in the statement of cash flows The system 100 uses the Direct Method which more clearly presents the actual cash receipts and payments during the period for operating activities as well as for Investing and financing activities. It also allows for presentation of actual cash flow using additional classifications such as, for example, tax and interest. The system 100 also allows for entirely new classifications which may be desired by management, investors, lenders or other stakeholders. If cash flow information is useful to investors when they are forecasting future cash flows, and the indirect method does not provide all the needed information or does not enable investors to generate it from the data or does not provide it an easily understandable format or contains errors, then the system 100 provides an advantage by using the direct method.

The method of preparing a CFS-Indirect Method requires that the income statement and the balance sheet be prepared first and the cash flow statement-indirect method is then derived from the income statement and balance sheet. System 100 prepares the CFS-Direct Method independently of the income statement and balance sheet. The CFS-Direct Method is thus ready before the income statement and the balance sheet and is independent of these two financial statements.

This has advantages, such as efficient use of computer resources, improved computation speed, and reduction in database errors. The early preparation of the CFS-Direct Method has great significance for managers, investors, lenders and the stock market as early cash flow information has significant economic value. Also, since the CFS-Direct Method is independent of the income statement and the balance sheet, any errors in these two documents are not passed on to the CFS-Direct Method. This reduction in errors is a significant economic advantage as it increases reliability of the CFS-Direct Method and reduces auditing costs.

Known accounting information systems are not designed to generate a direct method statement of cash flows. Further, known software packages do not even produce a correct statement of cash flows using the indirect method. Known approaches to preparing a correct statement of cash flows requires a nontrivial amount of manual intervention.

Accounting programs can have an Accrual Accounting Application Program (AAAP) installed in memory 30. The AAAP can receive transaction data as input and can generate various accounting reports derived from a database created by the input of transactions such as the income statement and the balances The AAAP can manage data for a general ledger and various sub ledgers. The AAAP can have, apart from the general ledger, the cash or bank ledger, customers ledger, the vendors ledger, the fixed asset ledger and other ledgers. The entirety of this accounting system can be described as the accrual basis of accounts.

The system 100 transforms data related to accrual basis accounts into data related to cash basis accounts. The system 100 reduces work and errors in maintaining a dual set of accounts (accrual and cash basis). The system 100 enables the preparation of a CFS by Direct Method. The system 100 is innovative and transformative as it substantially enhances the power of computers to provide accounting information.

The system 100 can automatically convert accrual accounts to cash accounts using a software program (e.g. CAAP instructions 42) stored in memory 30 with instructions executable by the processor 20. The system 100 implements automatic conversion of accrual accounts to cash accounts by accessing data from the general ledger, the customer, and the vendor sub ledger. An overview the software program operations (e.g. CAAP instructions 42) is shown in FIG. 6 which can involve hardware processor 20 transforming data from accrual accounting to cash basis accounting and then populates the cash flow ledger entries database 38. The hardware processor 20 can use the cash flow ledger entries database 38 for the CFS by Direct Method.

Embodiments described herein provide a system 100 and method for the conversion of data from accrual basis accounts to data for cash basis accounts.

The system 100 uses input data from the accrual basis of accounts, and sample accrual accounting information is provided to show the conversion of accrual accounts to cash basis accounts:

| Liquid Fund or Cash Accounts | |
|---|---|
| 2910 | Cash |
| 2920 | Bank, LCY |
| 2930 | Bank Currencies |
| 2940 | Giro Account |

The liquid fund or cash accounts shown here are only sample. The liquid fund or cash accounts may be added to by including, for example, bank overdraft accounts or inter-company accounts. Each addition or deletion to the liquid fund or cash accounts will lead the system 100 to create different cash flow ledger entries and hence a different CFS by Direct Method.

General Ledger Entries

| Posting Date | Entry No. | Document Type | G/L Account No. | Account Name | Description | Amount | Source Type | Source No. | Reversed |
|---|---|---|---|---|---|---|---|---|---|
| Jan. 1, 2020 | 54 | Invoice | 5110 | Long-term Bank Loans | Mercedes 300 | −50,000.00 | Fixed Asset | FA000010 | FALSE |
| Jan. 1, 2020 | 55 | Invoice | 1320 | Increases during the Year | Mercedes 300 | 40,000.00 | Fixed Asset | FA000010 | FALSE |
| Jan. 1, 2020 | 56 | Invoice | 5630 | Purchase VAT 25% | Mercedes 300 | 10,000.00 | Fixed Asset | FA000010 | FALSE |
| Jan. 1, 2020 | 1 | Payment | 2920 | Bank, LCY | Contribution of cash capital | 1,000,000.00 | Bank Account | NBL | FALSE |
| Jan. 1, 2020 | 2 | Payment | 3110 | Capital Stock | Contribution of cash capital | −1,000,000.00 | Bank Account | NBL | FALSE |
| Jan. 2, 2020 | 3 | Payment | 8210 | Office Supplies | Lewis Home Furniture | −20,000.00 | Vendor | 40000 | TRUE |
| Jan. 2, 2020 | 4 | Payment | 5630 | Purchase VAT 25% | Lewis Home Furniture | −5,000.00 | Vendor | 40000 | TRUE |
| Jan. 2, 2020 | 5 | Payment | 5410 | Vendors, Domestic | Lewis Home Furniture | 25,000.00 | Vendor | 40000 | TRUE |
| Jan. 2, 2020 | 6 | Payment | 5410 | Vendors, Domestic | Lewis Home Furniture | −25,000.00 | Vendor | 40000 | TRUE |
| Jan. 2, 2020 | 7 | Payment | 5630 | Purchase VAT 25% | Lewis Home Furniture | 5,000.00 | Vendor | 40000 | TRUE |
| Jan. 2, 2020 | 8 | Payment | 8210 | Office Supplies | Lewis Home Furniture | 20,000.00 | Vendor | 40000 | TRUE |
| Jan. 2, 2020 | 9 | Payment | 2920 | Bank, LCY | Lewis Home Furniture | −2,700.00 | Bank Account | NBL | FALSE |
| Jan. 2, 2020 | 10 | Payment | 5410 | Vendors, Domestic | Lewis Home Furniture | 2,700.00 | Vendor | 40000 | FALSE |
| Jan. 4, 2020 | 30 | Invoice | 6710 | Consulting Fees - Dom. | Invoice 1018 | −28,000.00 | Customer | 10000 | FALSE |
| Jan. 4, 2020 | 31 | Invoice | 5611 | Sales VAT 10% | Invoice 1018 | −2,800.00 | Customer | 10000 | FALSE |
| Jan. 4, 2020 | 32 | Invoice | 2310 | Customers Domestic | Invoice 1018 | 30,800.00 | Customer | 10000 | FALSE |
| Jan. 15, 2020 | 42 | | 2110 | Resale Items | Direct Cost 44127904 on Jan. 15, 2020 | 26,500.00 | | | FALSE |
| Jan. 15, 2020 | 43 | | 7191 | Direct Cost Applied, Retail | Direct Cost 44127904 on Jan. 15, 2020 | −26,500.00 | | | FALSE |
| Jan. 15, 2020 | 44 | Invoice | 7110 | Purch., Retail - Dom. | Invoice 1027 | 26,500.00 | Vendor | 44127904 | FALSE |
| Jan. 15, 2020 | 45 | Invoice | 5630 | Purchase VAT 25% | Invoice 1027 | 6,625.00 | Vendor | 44127904 | FALSE |
| Jan. 15, 2020 | 46 | Invoice | 5410 | Vendors, Domestic | Invoice 1027 | −33,125.00 | Vendor | 44127904 | FALSE |

-continued

General Ledger Entries

| Posting Date | Entry No. | Document Type | G/L Account No. | Account Name | Description | Amount | Source Type | Source No. | Reversed |
|---|---|---|---|---|---|---|---|---|---|
| Jan. 15, 2020 | 33 | Payment | 2920 | Bank, LCY | Customer 10 | 30,800.00 | Bank Account | NBL | FALSE |
| Jan. 15, 2020 | 34 | Payment | 2310 | Customers Domestic | Customer 10 | −30,800.00 | Customer | 10000 | FALSE |
| Jan. 19, 2020 | 47 | | 2110 | Resale Items | Direct Cost 44171511 on Jan. 19, 2020 | −11,500.00 | | | FALSE |
| Jan. 19, 2020 | 48 | | 7190 | Cost of Retail Sold | Direct Cost 44171511 on Jan. 19, 2020 | 11,500.00 | | | FALSE |
| Jan. 19, 2020 | 49 | Invoice | 6110 | Sales, Retail - Dom. | Invoice 1019 | −14,936.20 | Customer | 44171511 | FALSE |
| Jan. 19, 2020 | 50 | Invoice | 5610 | Sales VAT 25% | Invoice 1019 | −3,734.05 | Customer | 44171511 | FALSE |
| Jan. 19, 2020 | 51 | Invoice | 2310 | Customers Domestic | Invoice 1019 | 18,670.25 | Customer | 44171511 | FALSE |
| Jan. 22, 2020 | 35 | Payment | 2920 | Bank, LCY | Customer 20 | 50,000.00 | Bank Account | NBL | FALSE |
| Jan. 22, 2020 | 36 | Payment | 2310 | Customers Domestic | Customer 20 | −50,000.00 | Customer | 20000 | FALSE |
| Jan. 23, 2020 | 37 | Invoice | 8130 | Repairs and Maintenance | Invoice 1029 | 7,000.00 | Vendor | 62000 | FALSE |
| Jan. 23, 2020 | 38 | Invoice | 5630 | Purchase VAT 25% | Invoice 1029 | 1,750.00 | Vendor | 62000 | FALSE |
| Jan. 23, 2020 | 39 | Invoice | 5410 | Vendors, Domestic | Invoice 1029 | −8,750.00 | Vendor | 62000 | FALSE |
| Jan. 31, 2020 | 40 | Payment | 2920 | Bank, LCY | Vendor 62000 | −8,750.00 | Bank Account | NBL | FALSE |
| Jan. 31, 2020 | 41 | Payment | 5410 | Vendors, Domestic | Vendor 62000 | 8,750.00 | Vendor | 62000 | FALSE |
| Feb. 12, 2020 | 52 | Payment | 2920 | Bank, LCY | Customer 44 | 18,670.25 | Bank Account | NBL | FALSE |
| Feb. 12, 2020 | 53 | Payment | 2310 | Customers Domestic | Customer 44 | −18,670.25 | Customer | 44171511 | FALSE |
| Feb. 23, 2020 | 61 | Payment | 3120 | Retained Earnings | Drawing by Owner | 57,000.00 | Bank Account | NBL | FALSE |
| Feb. 23, 2020 | 62 | Payment | 2920 | Bank, LCY | Drawing by Owner | −57,000.00 | Bank Account | NBL | FALSE |
| Dec. 7, 2020 | 11 | Invoice | 7110 | Purch., Retail - Dom. | Order 106037 | 5,500.00 | Vendor | 10000 | FALSE |
| Dec. 7, 2020 | 12 | Invoice | 5630 | Purchase VAT 25% | Order 106037 | 1,375.00 | Vendor | 10000 | FALSE |
| Dec. 7, 2020 | 13 | Invoice | 5410 | Vendors, Domestic | Order 106037 | −6,875.00 | Vendor | 10000 | FALSE |
| Dec. 7, 2020 | 26 | | 2110 | Resale Items | Direct Cost 10000 on Dec. 7, 2020 | 5,500.00 | | | FALSE |
| Dec. 7, 2020 | 27 | | 7191 | Direct Cost Applied, Retail | Direct Cost 10000 on Dec. 7, 2020 | −5,500.00 | | | FALSE |
| Dec. 8, 2020 | 16 | Invoice | 1220 | Increases during the Year | Invoice 1025 | 35,000.00 | Fixed Asset | FA000090 | FALSE |
| Dec. 8, 2020 | 17 | Invoice | 5630 | Purchase VAT 25% | Invoice 1025 | 8,750.00 | Fixed Asset | FA000090 | FALSE |
| Dec. 8, 2020 | 18 | Invoice | 5410 | Vendors, Domestic | Invoice 1025 | −43,750.00 | Vendor | 62000 | FALSE |
| Dec. 8, 2020 | 23 | Invoice | 7110 | Purch., Retail - Dom. | Invoice 1026 | 2,625.00 | Vendor | 30000 | FALSE |
| Dec. 8, 2020 | 24 | Invoice | 5630 | Purchase VAT 25% | Invoice 1026 | 656.25 | Vendor | 30000 | FALSE |
| Dec. 8, 2020 | 25 | Invoice | 5410 | Vendors, Domestic | Invoice 1026 | −3,281.25 | Vendor | 30000 | FALSE |

Customer Ledger Entries

| Posting Date | Document Type | Document No. | Customer No. | Description | Original Amount | Amount | Remaining Amount |
|---|---|---|---|---|---|---|---|
| Jan. 4, 2020 | Invoice | 103040 | 10000 | Invoice 1018 | 30,800.00 | 30,800.00 | 0.00 |
| Jan. 15, 2020 | Payment | PP000003 | 10000 | Customer 10 | −30,800.00 | −30,800.00 | 0.00 |
| Jan. 19, 2020 | Invoice | 103041 | 44171511 | Invoice 1019 | 18,670.25 | 18,670.25 | 0.00 |
| Jan. 22, 2020 | Payment | PP000004 | 20000 | Customer 20 | −50,000.00 | −50,000.00 | −50,000.00 |
| Feb. 12, 2020 | Payment | PP000006 | 44171511 | Customer 44 | −18,670.25 | −18,670.25 | 0.00 |
| Mar. 9, 2021 | Invoice | 103042 | 61000 | Invoice 1020 | 54,700.00 | 54,700.00 | 0.00 |
| Mar. 15, 2021 | Invoice | 103043 | 61000 | Invoice 1021 | 5,625.00 | 5,625.00 | 3,000.00 |
| Mar. 27, 2021 | Payment | PP000009 | 61000 | Fairway Sound | −70,000.00 | −70,000.00 | −12,675.00 |

| Posting Date | Due Date | Open | On Hold | Entry No. | Amount (LCY) | Remaining Amt. (LCY) |
|---|---|---|---|---|---|---|
| Jan. 4, 2020 | Feb. 4, 2020 | FALSE | | 32 | 30,800.00 | 0.00 |
| Jan. 15, 2020 | Jan. 15, 2020 | FALSE | | 34 | −30,800.00 | 0.00 |
| Jan. 19, 2020 | Feb. 2, 2020 | FALSE | | 51 | 18,670.25 | 0.00 |
| Jan. 22, 2020 | Jan. 22, 2020 | TRUE | | 36 | −50,000.00 | −50,000.00 |
| Feb. 12, 2020 | Feb. 12, 2020 | FALSE | | 53 | −18,670.25 | 0.00 |

-continued

| Customer Ledger Entries | | | | | | |
|---|---|---|---|---|---|---|
| | Mar. 9, 2021 | Apr. 9, 2021 | FALSE | 81 | 54,700.00 | 0.00 |
| | Mar. 15, 2021 | Apr. 15, 2021 | TRUE | 84 | 5,625.00 | 3,000.00 |
| | Mar. 22, 2021 | Mar. 27, 2021 | TRUE | 86 | −70,000.00 | −12,675.00 |

Vendor Ledger Entries

| Posting Date | Document Type | Document No. | External Document No. | Document Date | Vendor No. | Amount | Description |
|---|---|---|---|---|---|---|---|
| Jan. 2, 2020 | Payment | PAYMENT0002 | | Jan. 2, 2020 | 40000 | 25,000.00 | Lewis Home Furniture |
| Jan. 2, 2020 | Payment | PAYMENT0002 | | Jan. 2, 2020 | 40000 | −25,000.00 | Lewis Home Furniture |
| Jan. 2, 2020 | Payment | PAYMENT0003 | | Jan. 2, 2020 | 40000 | 2,700.00 | Lewis Home Furniture |
| Jan. 15, 2020 | Invoice | 108065 | WMS0001 | Jan. 15, 2020 | 44127904 | −33,125.00 | Invoice 1027 |
| Jan. 23, 2020 | Invoice | 108064 | WH001 | Jan. 23, 2020 | 62000 | −8,750.00 | Invoice 1029 |
| Jan. 31, 2020 | Payment | PP000005 | | Jan. 31, 2020 | 62000 | 8,750.00 | Vendor 62000 |
| Dec. 7, 2020 | Invoice | 108061 | LP0001 | Jan. 5, 2020 | 10000 | −6,875.00 | Order 106037 |
| Dec. 8, 2020 | Invoice | 108062 | WH0001 | Dec. 8, 2020 | 62000 | −43,750.00 | Invoice 1025 |
| Dec. 8, 2020 | Payment | GJ0001 | | Dec. 8, 2020 | 62000 | 11,000.00 | WalkerHolland |
| Dec. 8, 2020 | Payment | PP000002 | | Dec. 8, 2020 | 62000 | 32,750.00 | WalkerHolland |
| Dec. 8, 2020 | Invoice | 108063 | CT0001 | Dec. 8, 2020 | 30000 | −3,281.25 | Invoice 1026 |
| Dec. 9, 2020 | Payment | PP000001 | | Dec. 9, 2020 | 10000 | 1,520.00 | London Postmaster |
| Feb. 9, 2021 | Invoice | 108066 | BTM0001 | Feb. 9, 2021 | 44729910 | −24,333.88 | Invoice 1030 |
| Feb. 15, 2021 | Invoice | 108067 | BTM0002 | Feb. 15, 2021 | 44729910 | −12,100.00 | Invoice 1031 |
| Feb. 27, 2021 | Payment | PP000008 | | Feb. 27, 2021 | 44729910 | 19,000.00 | Boybridge Tool Mart |

| Posting Date | Closed by Entry No. | Closed at Date | Closed by Amount | Original Amount | Amount (LCY) | Remaining Amount |
|---|---|---|---|---|---|---|
| Jan. 2, 2020 | 6 | Jan. 2, 2020 | 25,000.00 | 25,000.00 | 25,000.00 | 0.00 |
| Jan. 2, 2020 | 5 | Jan. 2, 2020 | 0.00 | −25,000.00 | −25,000.00 | 0.00 |
| Jan. 2, 2020 | 0 | | 0.00 | 2,700.00 | 2,700.00 | 2,700.00 |
| Jan. 15, 2020 | 0 | | 0.00 | −33,125.00 | −33,125.00 | −33,125.00 |
| Jan. 23, 2020 | 41 | Jan. 31, 2020 | −8,750.00 | −8,750.00 | −8,750.00 | 0.00 |
| Jan. 31, 2020 | 0 | | 0.00 | 8,750.00 | 8,750.00 | 0.00 |
| Dec. 7, 2020 | 0 | | 0.00 | −6,875.00 | −6,875.00 | −5,355.00 |
| Dec. 8, 2020 | 22 | Dec. 8, 2020 | −32,750.00 | −43,750.00 | −43,750.00 | 0.00 |
| Dec. 8, 2020 | 18 | Dec. 8, 2020 | 11,000.00 | 11,000.00 | 11,000.00 | 0.00 |
| Dec. 8, 2020 | 0 | | 0.00 | 32,750.00 | 32,750.00 | 0.00 |
| Dec. 8, 2020 | 0 | | 0.00 | −3,281.25 | −3,281.25 | −3,281.25 |
| Dec. 9, 2020 | 13 | Dec. 9, 2020 | 1,520.00 | 1,520.00 | 1,520.00 | 0.00 |
| Feb. 9, 2021 | 0 | | 0.00 | −24,333.88 | −24,333.88 | −14,333.88 |
| Feb. 15, 2021 | 0 | | 0.00 | −12,100.00 | −12,100.00 | −6,100.00 |
| Feb. 27, 2021 | 0 | | 0.00 | 19,000.00 | 19,000.00 | 3,000.00 |

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Figure 2:
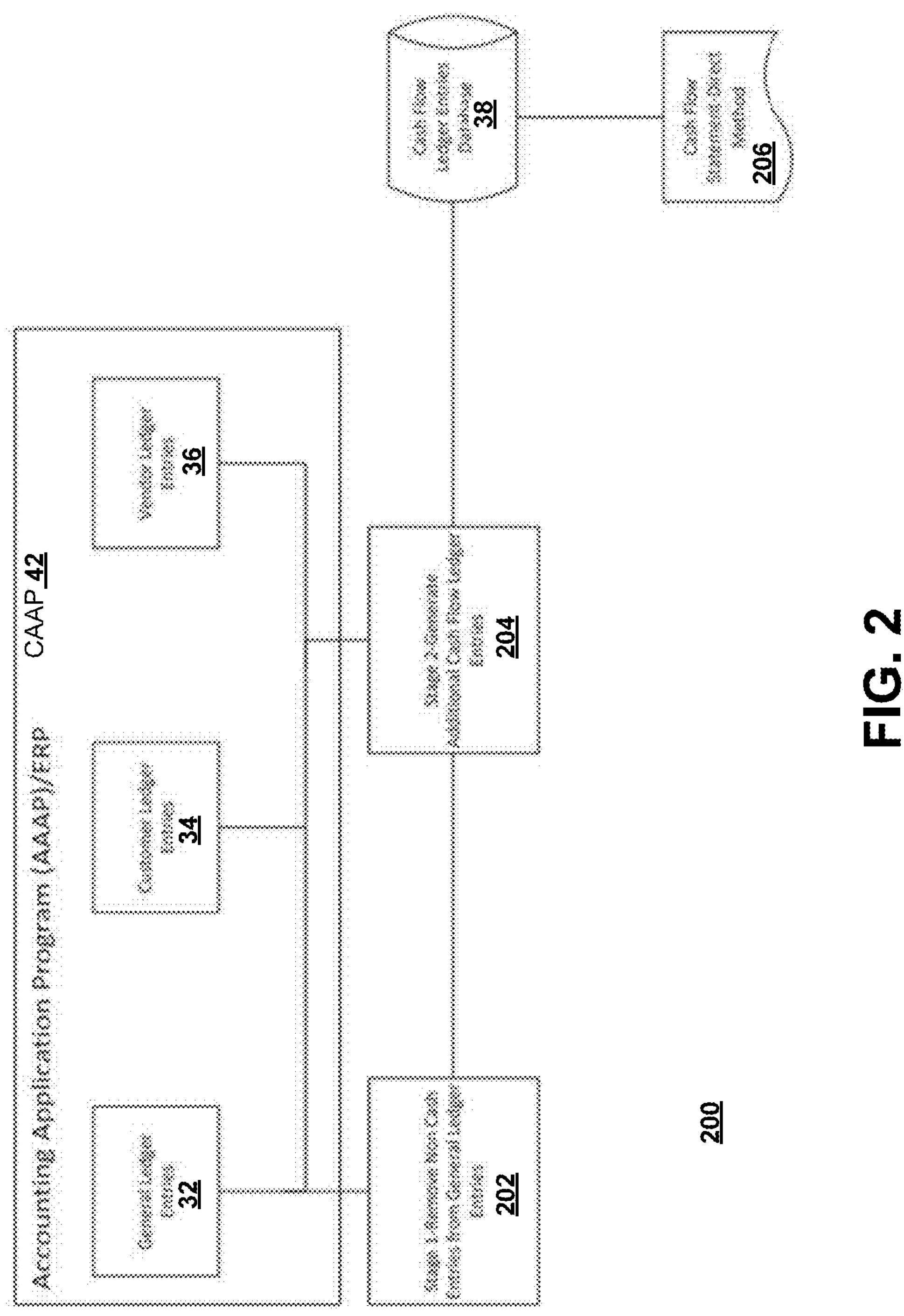
FIG. 2 shows an example method of an accounting application program for generating computerized databases.

FIG. 2 shows an example method 200 of an accounting application program for generating computerized databases. For example, the hardware processor 20 can automatically execute the CAAP instructions 42 (stored in memory 30) to generate or update the cash flow ledger entries database 38.

The method 200 involves electrical computers, digital processing, and visual display. The method 200 involves using the hardware processor 20 for generation and storage of a computerized cash flow ledger entries database 38. The method 200 further involves using the hardware processor 20 for retrieval and visualizations of data from the cash flow ledger entries database 38 to implement a CFS by Direct Method 206.

In some embodiments, the method 200 involves storing general ledger entries 32 in the memory 30, and using the hardware processor 20 to automatically extract cash related entries from the general ledger entries 32, modify the extracted cash related entries from the general ledger entries 32, create cash flow ledger entries from the modified cash related entries, and populate the cash flow ledger entries database 38 with the cash flow ledger entries. In some embodiments, the method 200 involves: storing customer ledger entries 34 and vendor ledger entries 36 in the memory 30, and using the hardware processor 20 to create additional cash flow ledger entries by extracting and modifying data from the customer ledger entries 34, the vendor ledger entries 36, and the general ledger entries 32, and using the hardware processor 20 to populate the cash flow ledger entries database 38 with the additional cash flow Ledger entries.

The method 200 involves modifying databases to create a new computerized cash flow ledger entries database 38 containing only data relating to cash transactions. The method involves using the new computerized cash flow ledger entries database 38 in response to commands from a client device 60 and a cloud server 70 to produce different cash accounting reports, including a CFS by the Direct Method 206.

In some embodiments, the method 200 involves using the system 100 to process data from the general ledger entries 32, customer ledger entries 34, and vendor ledger entries 36 using two stages:

Stage 1 (202): Separate cash entries and non-cash entries from the general ledger entries 32; and Stage 2 (204): Create additional cash entries from the customer ledger entries 34, vendor ledger entries 36, and the general ledger entries 32.

For Stage 1 (202), the system 100 automatically creates actual cash flow ledger entries (in the cash flow ledger entries database 38) from general ledger entries 32. In Stage 1 (202), general ledger entries 32 are separated by the hardware processor 32 into cash entries and non-cash entries. The cash entries are added by the hardware processor 32 to the cash flow ledger entries database 38 after modification. For example, the modification can be made by deleting the cash account and multiplying the remaining lines by −1 For Stage 1, the hardware processor 20 can automatically separate cash entries and non-cash entries from general ledger entries 32 to generate or update the cash flow ledger entries database 38.

Figure 3:
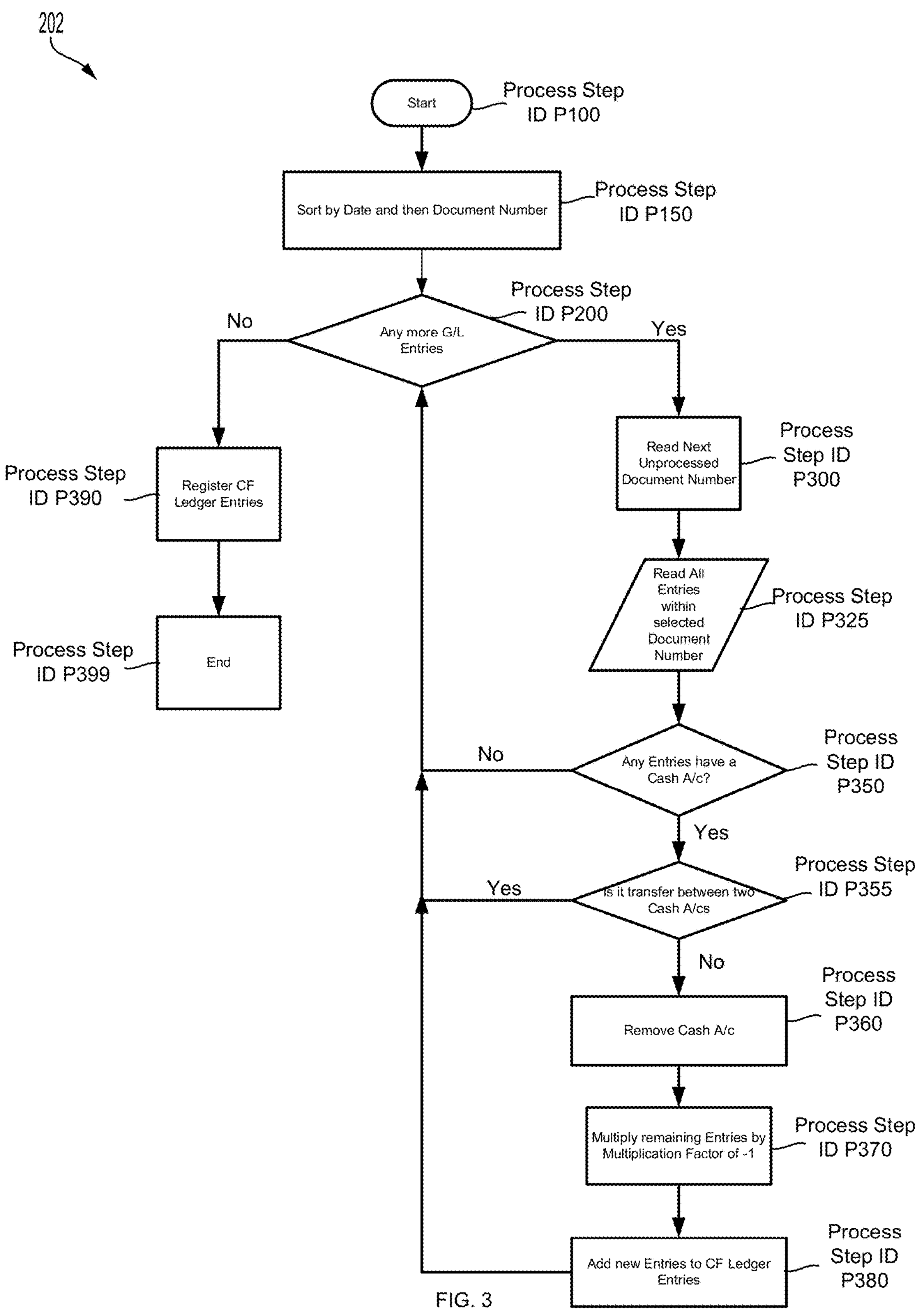
FIG. 3 shows an example method of a sub-process for generating computerized databases by automatically separating cash and non-cash general ledger entries.

FIG. 3 shows an example method of a sub-process (Stage 1 202) for generating computerized databases (e.g. the cash flow ledger entries database 38) by automatically separating cash and non-cash general ledger entries 32.

The sub-process starts at P100 to generate a computerized database by automatically separating cash and non-cash general ledger entries. At P150, the hardware processor 20 accesses the memory 30 storing general ledger entries 32 to automatically process and sort the general ledger entries 32 by date and document identification number. Each entry of the general ledger entries 32 has different data fields, such as a date, an amount, and an account number (which can indicate an account type). A document can have a collection of general ledger entries 32. The memory 30 stores a plurality of documents having general ledger entries 32. At P200, the hardware processor 20 determines whether there are additional documents (or data sets) of general ledger (G/L) entries 32 to automatically process and sort. If so, at P300, the hardware processor 20 reads the next unprocessed document number. At P325, the hardware processor 20 reads all general ledger entries 32 within the selected document number.

At P350, the hardware processor 20 determines whether any of the general ledger entries 32 have a data field indicating a cash account. If there are no general ledger entries 32 having a data field indicating a cash account (as identified in the above noted example table for Liquid Fund or Cash Accounts) in the document, then the hardware processor 20 returns to P200 to determine whether there are any additional documents (or data sets) of general ledger entries 32 to automatically process and sort. If there is an entry (or a plurality of entries) of the general ledger entries 32 having a data field indicating a cash account in the document, then the hardware processor 20 proceeds to P355 to determine if the entry is a transfer between two cash accounts. If the entry is a transfer between two cash accounts, then the hardware processor 20 returns to P200 to determine whether there are any additional documents (or data sets) of general ledger entries 32 to automatically process and sort. If the entry is not a transfer between two cash accounts, then the hardware processor 20 proceeds to P360 to copy the entry for the cash account (from the document or data set of the general ledger entries 32 currently being processed by the hardware processor 20). At P370, the hardware processor 20 multiplies the remaining entries (of the document or data set of the general ledger entries 32 currently being processed by the hardware processor 20) by multiplication factor of −1. The function of the operation is that each line created is added to the cash flow ledger entries database 38. At P380, the hardware processor 20 adds the new entry (with the cash account removed and the remaining lines multiplied by −1) to the cash flow ledger entries database 38. The remaining entries multiplied by the multiplication factor (−1) create new accounting entries which are added to the cash flow ledger entries database 38. After adding the entry to the cash flow ledger entries database 38, the hardware processor 20 returns to P200 to determine whether there are any additional documents (or data sets) of general ledger entries 32 to automatically process and sort.

If there are no more documents (or data sets) of general ledger entries 32 to automatically process and sort, then at P390 the hardware processor 20 registers the cash flow ledger entries database 38 which contains the entries, and ends the sub-process at P399. Accordingly, the sub-process results in the hardware processor 20 generating or updating the cash flow ledger entries database 38 which transformed data extracted from the general ledger entries 32. For this sub-process (Stage 1), the hardware processor 20 automatically separates cash entries and non-cash entries from general ledger entries 32 to generate or update the cash flow ledger entries database 38.

For Stage 2 (204), the system 100 creates additional entries after reclassifying general ledger entries 32. In Stage 2 (204), the cash entries created in Stage 1 (for the cash flow ledger entries database 38) may be modified if required. Modification is required if the receipt/payment is applied to an Invoice in either the accounts receivable (A/R) or accounts payable (A/P) module. Modification, if required, is by way of adding additional lines to show the exact nature of the receipt and payment.

The system 100 can add additional entries/lines by determining from the accounts receivable (A/R) and accounts payable (A/P) module, the invoice numbers and (Original) document numbers to which the receipt or payment has been applied.

The system 100 can add additional entries/lines by determining from the (Original) document numbers, the general ledger accounts which are impacted by the receipt or payment and the values thereof.

The system 100 can add additional entries (or lines) by splitting the receipt or payment value proportionately between the various general ledger accounts impacted by the receipt or payment. For example, the system 100 can split the receipt or payment proportionately. However, it is possible to use different logic. For example, the first allocation of payment may be to the VAT collected or paid and the excess amounts allocated proportionately to other accounts. In another embodiment, the first allocation of the payment may be to the payment for inventory and then the other accounts are allocated proportionately to other accounts. At present, there is no particular method of allocation of receipt/payment prescribed by GAAP. System 100 is flexible and can be programmed to allocate receipts/payments between Invoices and within an invoice on any basis desired or prescribed by GAAP or law.

The system 100 can add additional entries (or lines) by creating lines or entries to reflect this split. The system 100 can add additional entries (or lines) by adding the entries (or lines) created to the cash flow ledger entries database 38.

Any transfer between two liquid fund accounts has no impact on the cash flow ledger entries as both debits and credits cancel out.

Figure 4:
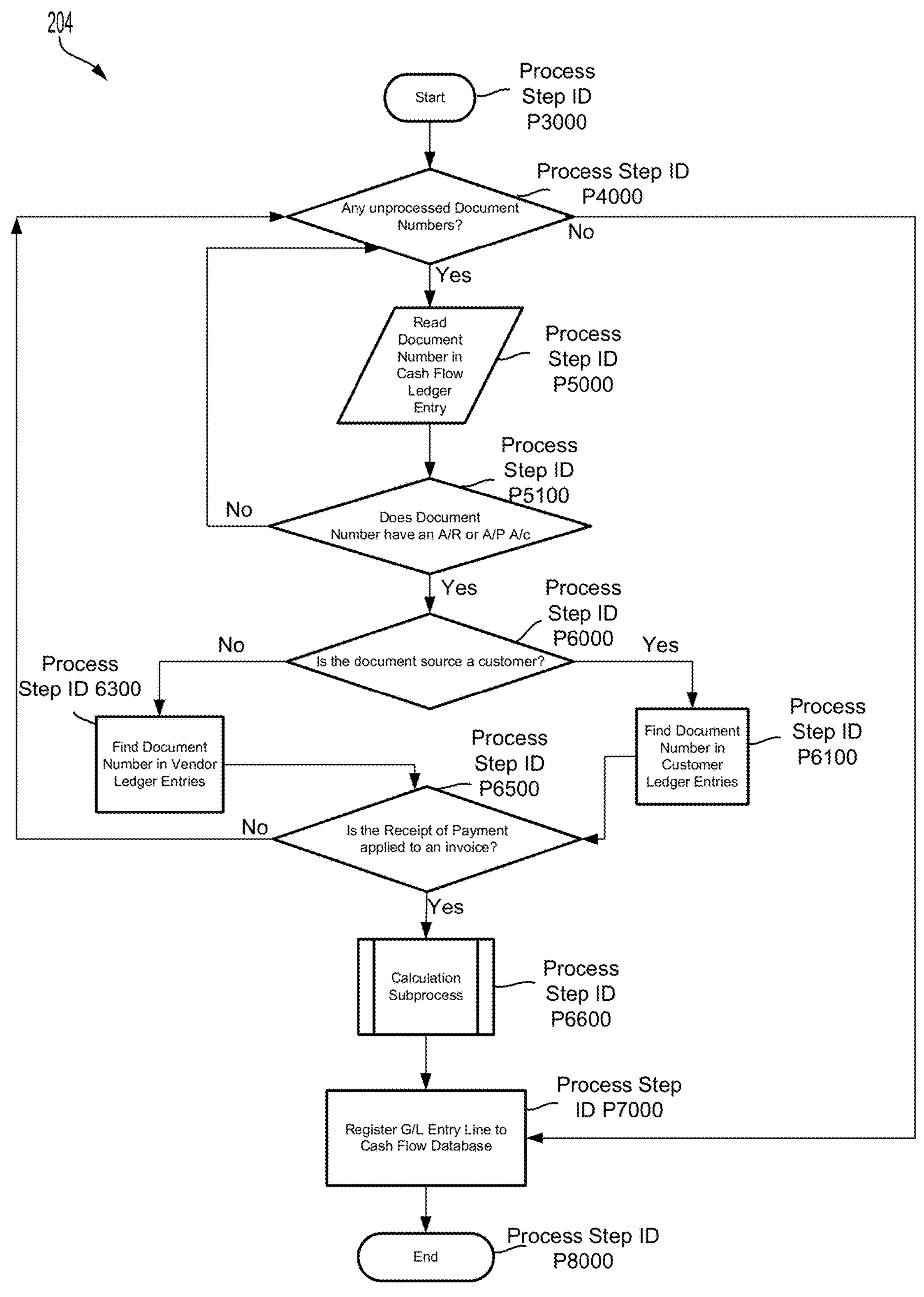
FIG. 4 shows an example method of a sub-process for generating computerized databases by automatically creating additional cash flow ledger entries.

FIG. 4 shows an example method of a sub-process (Stage 2 204) for generating computerized databases by automatically creating additional cash flow ledger entries.

At P3000, the hardware processor 20 starts the sub-process. At P4000, the hardware processor 20 determines if there are any unprocessed document numbers. If so, then at P5000 the hardware processor 20 reads a document number in a cash flow ledger entry (e.g. of the cash flow ledger entries database 38). At P5100, the hardware processor 20 determines if the document number has an A/R account or an A/P account. If not, then the hardware processor 20 returns the P4000 to determine if there are any additional unprocessed document numbers. If the hardware processor 20 determines that the document number has an A/R account or an A/P account, then at P6000 the hardware processor 20 determines whether the document source is a customer. If the hardware processor 20 determines that the document source is a customer, at P6100, the hardware processor 20 finds the document number in the customer ledger entries 34. If the hardware processor 20 determines that the document source is not a customer, at P6300, the hardware processor 20 finds the document number in the vendor ledger entries 36. At P6500, the hardware processor 20 determines whether the receipt or payment is applied to an invoice within the A/R module or the A/P module. If not, then the hardware processor 20 returns to P4000 to determine if there are any additional unprocessed document numbers. If the hardware processor 20 determines that the receipt or payment is applied to an invoice, then at P6600 the hardware processor 20 implements a calculation sub-process. At P7000, the hardware processor 20 registers the general ledger entry line created from the subprocess to the cash flow ledger entries database 38. At P8000, the hardware processor 20 ends the sub-process.

Figure 5:
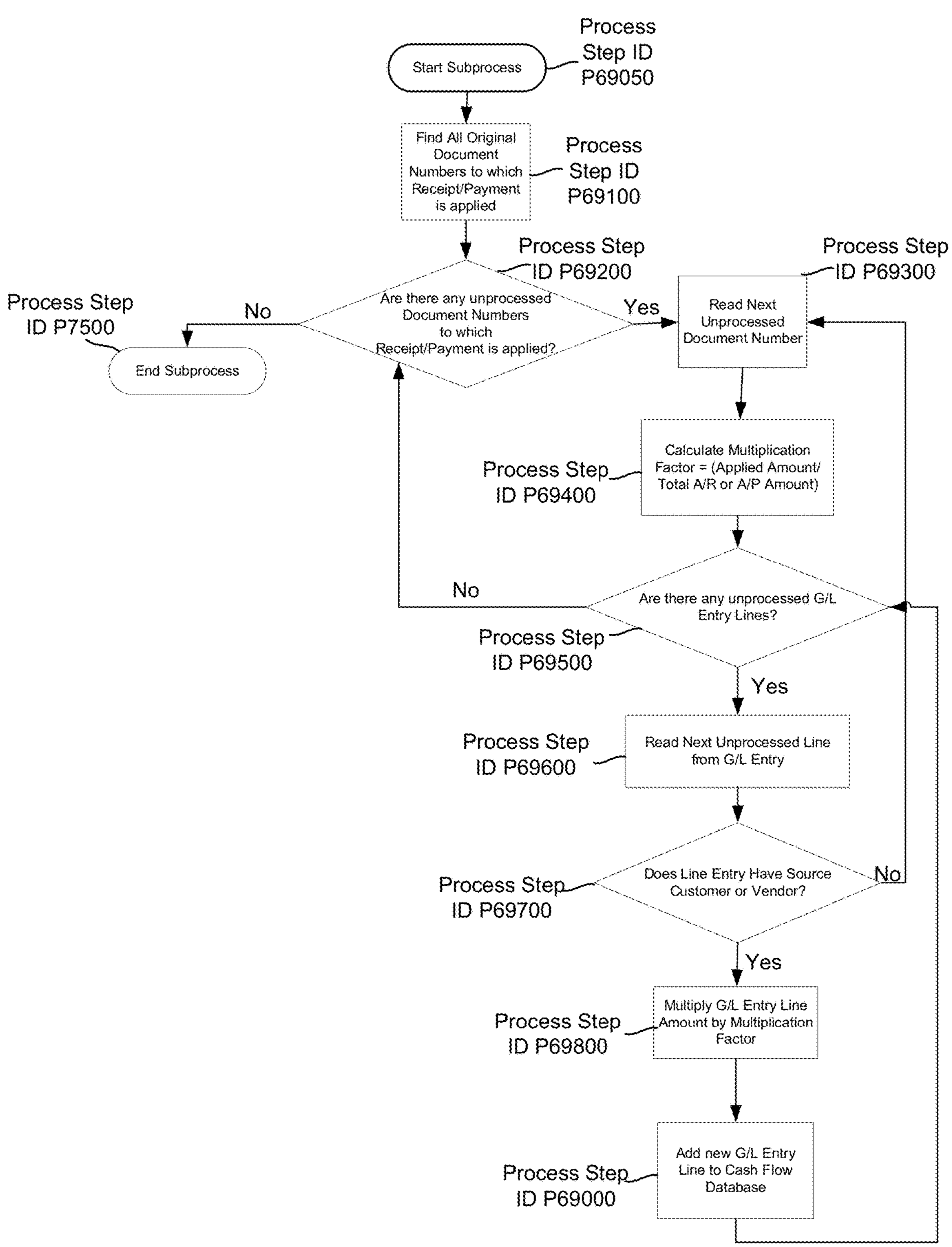
FIG. 5 shows an example method of a sub-process for generating computerized databases by automatically creating additional cash flow entries.

FIG. 5 shows another example method of a sub-process for generating computerized databases by automatically creating additional cash flow entries.

At P69050, the hardware processor 20 starts the sub-process. At P69100, the hardware processor 20 finds all document numbers to which receipt or payment is applied. At P69200, the hardware processor 20 determines if there are any additional unprocessed document numbers to which receipt or payment is applied. If so, at P69300, the hardware processor 20 reads the next unprocessed document number to which receipt or payment is applied. At P69400, the hardware processor 20 calculates a multiplication factor. The multiplication factor is used to determine that the applied amount is proportionately distributed between the various accounts/lines in the Invoice. For example, the multiplication factor can be the applied amount divided by the total A/R or AP amount. At P69500, the hardware processor 20 determines whether there are any unprocessed general ledger entry lines. If the hardware processor 20 determines that there are unprocessed lines of the general ledger entries 32, at P69600, the hardware processor 20 reads the next unprocessed line from the general ledger entries 32. At P69700, the hardware processor 20 determines whether the line entry has a source customer or vendor. If so, at P69800, the hardware processor 20 multiplies the line from the general ledger entries 32 by the multiplication factor. At P69000, the hardware processor 20 adds a new general ledger entry line to the cash flow ledger entries database 38. The hardware processor 20 returns to P69500 to determine whether there are any unprocessed general ledger entry lines. If so, the hardware processor 20 proceeds to P69600 and reads the next unprocessed line from the general ledger entries 32. If hardware processor 20 determines that there are no unprocessed general ledger entry lines, then the hardware processor 20 returns to P69200 to determine whether there are any additional unprocessed document numbers to which receipt or payment is applied. If so, then the hardware processor 20 proceeds to P69300. If not, then at P75000, the hardware processor 20 ends the sub-process.

The following table shows an overview of the conversion of all sample accrual general ledger entries to cash flow ledger entries. On the left hand side, all the accrual basis general ledger entries are shown, and on the right hand side cash basis general ledger entries for each of the general ledger entries are shown. cash flow entries created in Stage 1 and in Stage 2 are identified separately. Only general ledger entries which have a liquid funds account have a corresponding cash flow ledger entry. Entries which do not have a liquid fund account do not have a corresponding cash flow ledger entry.

The following tables (Case 1 to Case 11) show the detailed transformation by system 100 of each of the sample general ledger entries into cash flow ledger entries.

| ORIGINAL GENERAL LEDGER ENTRY | | | | | | | |
|---|---|---|---|---|---|---|---|
| Document No. | Entry No. | Posting Date | G/L Account No. | Account Name | Description | Amount | CASE NO |
| FA0001 | 54 | Jan. 1, 2020 | 5110 | Long-term Bank Loans | Mercedes 300 | −50,000.00 | < > |
| FA0001 | 55 | Jan. 1, 2020 | 1320 | Increases during the Year | Mercedes 300 | 40,000.00 | |
| FA0001 | 56 | Jan. 1, 2020 | 5630 | Purchase VAT 25% | Mercedes 300 | 10,000.00 | |
| PAYMENT0001 | 1 | Jan. 1, 2020 | 2920 | Bank, LCY | Contribution of cash capital | 1,000,000.00 | <Case 1> |
| PAYMENT0001 | 2 | Jan. 1, 2020 | 3110 | Capital Stock | Contribution of cash capital | −1,000,000.00 | Stage 1 |
| PAYMENT0002 | 3 | Jan. 2, 2020 | 8210 | Office Supplies | Lewis Home Furniture | −20,000.00 | < > |
| PAYMENT0002 | 4 | Jan. 2, 2020 | 5630 | Purchase VAT 25% | Lewis Home Furniture | −5,000.00 | |
| PAYMENT0002 | 5 | Jan. 2, 2020 | 5410 | Vendors, Domestic | Lewis Home Furniture | 25,000.00 | |
| PAYMENT0002 | 6 | Jan. 2, 2020 | 5410 | Vendors, Domestic | Lewis Home Furniture | −25,000.00 | |
| PAYMENT0002 | 7 | Jan. 2, 2020 | 5630 | Purchase VAT 25% | Lewis Home Furniture | 5,000.00 | |
| PAYMENT0002 | 8 | Jan. 2, 2020 | 8210 | Office Supplies | Lewis Home Furniture | 20,000.00 | |
| PAYMENT0003 | 9 | Jan. 2, 2020 | 2920 | Bank, LCY | Lewis Home Furniture | −2,700.00 | <Case 2> |
| PAYMENT0003 | 10 | Jan. 2, 2020 | 5410 | Vendors, Domestic | Lewis Home Furniture | 2,700.00 | Stage 1 |
| 103040 | 30 | Jan. 4, 2020 | 6710 | Consulting Fees - Dom. | Invoice 1018 | −28,000.00 | < > |
| 103040 | 31 | Jan. 4, 2020 | 5611 | Sales VAT 10% | Invoice 1018 | −2,800.00 | |
| 103040 | 32 | Jan. 4, 2020 | 2310 | Customers Domestic | Invoice 1018 | 30,800.00 | |
| 108065 | 42 | Jan. 15, 2020 | 2110 | Resale Items | Direct Cost 44127904 on Jan. 15, 2020 | 26,500.00 | < > |
| 108065 | 43 | Jan. 15, 2020 | 7191 | Direct Cost Applied, Retail | Direct Cost 44127904 on Jan. 15, 2020 | −26,500.00 | |
| 108065 | 44 | Jan. 15, 2020 | 7110 | Purch., Retail - Dom. | Invoice 1027 | 26,500.00 | |
| 108065 | 45 | Jan. 15, 2020 | 5630 | Purchase VAT 25% | Invoice 1027 | 6,625.00 | |
| 108065 | 46 | Jan. 15, 2020 | 5410 | Vendors, Domestic | Invoice 1027 | −33,125.00 | |
| PP000003 | 33 | Jan. 15, 2020 | 2920 | Bank, LCY | Customer 10 | 30,800.00 | <Case 3> |
| PP000003 | 34 | Jan. 15, 2020 | 2310 | Customers Domestic | Customer 10 | −30,800.00 | Stage 1 Step 2 |
| PP000004 | 35 | Jan. 22, 2020 | 2920 | Bank, LCY | Customer 20 | 50,000.00 | <Case 4> |
| PP000004 | 36 | Jan. 22, 2020 | 2310 | Vendors, Domestic | Customer 20 | −50,000.00 | Stage 1 |
| 103041 | 47 | Jan. 19, 2020 | 2110 | Resale Items | Direct Cost 44171511 on Jan. 19, 2020 | −11,500.00 | < > |
| 103041 | 48 | Jan. 19, 2020 | 7190 | Cost of Retail Sold | Direct Cost 44171511 on Jan. 19, 2020 | 11,500.00 | |
| 103041 | 49 | Jan. 19, 2020 | 6110 | Sales, Retail - Dom. | Invoice 1019 | −14,936.20 | |
| 103041 | 50 | Jan. 19, 2020 | 5610 | Sales VAT 25% | Invoice 1019 | −3,734.05 | |
| 103041 | 51 | Jan. 19, 2020 | 2310 | Customers Domestic | Invoice 1019 | 18,670.25 | |
| PP000005 | 40 | Jan. 31, 2020 | 2920 | Bank, LCY | Vendor 62000 | −8,750.00 | <Case 5> |
| PP000005 | 41 | Jan. 31, 2020 | 5410 | Vendors, Domestic | Vendor 62000 | 8,750.00 | Stage 1 Stage 2 |
| PP000006 | 52 | Feb. 12, 2020 | 2920 | Bank, LCY | Customer 44 | 18,670.25 | <Case 6> |
| PP000006 | 53 | Feb. 12, 2020 | 2310 | Customers Domestic | Customer 44 | −18,670.25 | Stage 1 Stage 2 |
| PP000007 | 62 | Feb. 23, 2020 | 2920 | Bank, LCY | Drawing by Owner | −57,000.00 | <Case 7> |
| PP000007 | 61 | Feb. 23, 2020 | 3120 | Retained Earnings | Drawing by Owner | 57,000.00 | Stage 1 |
| 108061 | 11 | Dec. 7, 2020 | 7110 | Purch., Retail - Dom. | Order 106037 | 5,500.00 | < > |
| 108061 | 12 | Dec. 7, 2020 | 5630 | Purchase VAT 25% | Order 106037 | 1,375.00 | |
| 108061 | 13 | Dec. 7, 2020 | 5410 | Vendors, Domestic | Order 106037 | −6,875.00 | |
| 108061 | 26 | Dec. 7, 2020 | 2110 | Resale Items | Direct Cost 10000 on Dec. 7, 2020 | 5,500.00 | |

-continued

| ORIGINAL GENERAL LEDGER ENTRY | | | | | | |
|---|---|---|---|---|---|---|
| 108061 | 27 | Dec. 7, 2020 | 7191 | Direct Cost Applied, Retail | Direct Cost 10000 on Dec. 7, 2020 | −5,500.00 |

| Document No. | Document No. | Entry No. | Original Doc. No. | Cash Flow Date | Reclassify | Cash Flow Account No. | Account Name | Description | Amount (LCY) |
|---|---|---|---|---|---|---|---|---|---|
| FA0001 | This Document is not converted by program to a Cash Flow Ledger Entry as Document does not have a Cash | | | | | | | | |
| FA0001 | Account. It may be used by program, if applicable, in other Cash Flow Ledger Entries. | | | | | | | | |
| FA0001 | | | | | | | | | |
| PAYMENT0001 | | | | | | | | | |
| PAYMENT0001 | PAYMENT0001 | 1 | | Jan. 1, 2020 | FALSE | 3110 | Capital Stock | Contribution of cash capital | 1,000,000.00 |
| PAYMENT0002 | This Document is not converted by program to a Cash Flow Ledger Entry as Document does not have a Cash | | | | | | | | |
| PAYMENT0002 | Account. It may be used by program, if applicable, in other Cash Flow Ledger Entries. | | | | | | | | |
| PAYMENT0002 | | | | | | | | | |
| PAYMENT0002 | | | | | | | | | |
| PAYMENT0002 | | | | | | | | | |
| PAYMENT0002 | | | | | | | | | |
| PAYMENT0003 | | | | | | | | | |
| PAYMENT0003 | PAYMENT0003 | 2 | | Jan. 2, 2020 | FALSE | 5410 | Vendors, Domestic | Lewis Home Furniture | −2,700.00 |
| 103040 | This Document is not converted by program to a Cash Flow Ledger Entry as Document does not have a Cash | | | | | | | | |
| 103040 | Account. It may be used by program, if applicable, in other Cash Flow Ledger Entries. | | | | | | | | |
| 103040 | | | | | | | | | |
| 108065 | This Document is not converted by program to a Cash Flow Ledger Entry as Document does not have a Cash | | | | | | | | |
| 108065 | Account. It may be used by program, if applicable, in other Cash Flow Ledger Entries. | | | | | | | | |
| 108065 | | | | | | | | | |
| 108065 | | | | | | | | | |
| 108065 | | | | | | | | | |
| PP000003 | | | | | | | | | |
| PP000003 | PP000003 | 11 | | Jan. 15, 2020 | TRUE | 2310 | Customers Domestic | Customer 10 | 30,800.00 |
| | PP000003 | 12 | 103040 | Jan. 15, 2020 | TRUE | 6710 | Consulting Fees - Dom. | Customer 10 | 28,000.00 |
| | PP000003 | 13 | 103040 | Jan. 15, 2020 | TRUE | 5611 | Sales VAT 10% | Customer 10 | 2,800.00 |
| | PP000003 | 14 | | Jan. 15, 2020 | TRUE | 2310 | Customers Domestic | Customer 10 | −30,800.00 |
| PP000004 | | | | | | | | | |
| PP000004 | PP000004 | 15 | | Jan. 22, 2020 | FALSE | 2310 | Customers Domestic | Customer 20 | 50,000.00 |
| 103041 | This Document is not converted by program to a Cash Flow Ledger Entry as Document does not have a Cash | | | | | | | | |
| 103041 | Account. It may be used by program, if applicable, in other Cash Flow Ledger Entries. | | | | | | | | |
| 103041 | | | | | | | | | |
| 103041 | | | | | | | | | |
| 103041 | | | | | | | | | |
| PP000005 | | | | | | | | | |
| PP000005 | PP000005 | 16 | | Jan. 31, 2020 | TRUE | 5410 | Vendors, Domestic | Vendor 62000 | −8,750.00 |
| | PP000005 | 17 | 108064 | Jan. 31, 2020 | TRUE | 8130 | Repairs & Maintenance | Vendor 62000 | −7,000.00 |
| | PP000005 | 18 | 108064 | Jan. 31, 2020 | TRUE | 5630 | Purchase VAT 25% | Vendor 62000 | −1,750.00 |
| | PP000005 | 19 | | Jan. 31, 2020 | TRUE | 5410 | Vendors, Domestic | Vendor 62000 | 8,750.00 |
| PP000006 | | | | | | | | | |
| PP000006 | PP000006 | 20 | | Feb. 12, 2020 | TRUE | 2310 | Customers Domestic | Customer 44 | 18,670.25 |
| | PP000006 | 21 | 103041 | Feb. 12, 2020 | TRUE | 6110 | Sales, Retail - Dom. | Customer 44 | 14,936.20 |
| | PP000006 | 22 | 103041 | Feb. 12, 2020 | TRUE | 5610 | Sales VAT 25% | Customer 44 | 3,734.05 |
| | PP000006 | 23 | | Feb. 12, 2020 | TRUE | 2310 | Customers Domestic | Customer 44 | −18,670.25 |
| PP000007 | | | | | | | | | |
| PP000007 | PP000007 | 24 | | Feb. 23, 2020 | FALSE | 3120 | Retained Earnings | Drawing by Owner | −57,000.00 |
| 108061 | This Document is not converted by program to a Cash Flow Ledger Entry as Document does not have a Cash | | | | | | | | |
| 108061 | Account. It may be used by program, if applicable, in other Cash Flow Ledger Entries. | | | | | | | | |
| 108061 | | | | | | | | | |
| 108061 | | | | | | | | | |
| 108061 | | | | | | | | | |

CASE 1

Stage 1 Start: General Ledger Doc. No. PAYMENT0001 is identified for inclusion in Cash Basis Accounts by the program as it has a Liquid Fund A/c (G/L Account No. 2920)

General Ledger Entry

| Entry No. | Document No. | Posting Date | Document Type | G/L Account No. | Account Name | Description | Amount | Source Type | Source No. | Reversed |
|---|---|---|---|---|---|---|---|---|---|---|
| 1 | PAYMENT0001 | Jan. 1, 2020 | Payment | 2920 | Bank, LCY | Contribution of cash capital | 1,000,000.00 | Bank Account | NBL | FALSE |
| 2 | PAYMENT0001 | Jan. 1, 2020 | Payment | 3110 | Capital Stock | Contribution of cash capital | −1,000,000.00 | Bank Account | NBL | FALSE |

Stage 1 Processing Steps:
1 Entry No. 1 is deleted
2 Entry No. 2 is multiplied by −1 & added to CF Ledger Entry as Entry No. 1 below
Stage 1 Completion: Cash Flow Ledger Entry from General ledger Entry Cash Flow Ledger Entry

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| 1 | PAYMENT0001 | | Jan. 1, 2020 | FALSE | 3110 | Capital Stock | Contribution of cash capital | 1,000,000.00 | Liquid Funds | NBL |

Stage 2 As Doc. No. PAYMENT0001 does not have an A/R or A/P Account, the program does not go to Stage 2

25

CASE 2

Stage 1 Start: General ledger Doc. No. PAYMENT0003 is identified for inclusion in Cash Basis Accounts by the program as it has a Liquid Fund A/c (G/L Account No. 2920)

General Ledger Entry

| Entry No. | Document No. | Posting Date | Document Type | G/L Account No. | Account Name | Description | Amount | Source Type | Source No. | Reversed |
|---|---|---|---|---|---|---|---|---|---|---|
| 9 | PAYMENT0003 | Jan. 2, 2020 | Payment | 2520 | Bank, LCY | Lewis Home Furniture | −2,700.00 | Bank Account | NBL | FALSE |
| 10 | PAYMENT0003 | Jan. 2, 2020 | Payment | 5410 | Vendors, Domestic | Lewis Home Furniture | 2,700.00 | Vendor | 40000 | FALSE |

Stage 1 Processing Steps:
1 Entry No. 9 is deleted
2 Entry No. 10 is multiplied by −1 & added to CF Ledger Entry as Entry No. 2 below
Stage 1 Completion: Cash Flow Ledger Entry from General ledger Entry Cash Flow Ledger Entry

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| 2 | PAYMENT0003 | | Jan. 2, 2020 | FALSE | 5410 | Vendors, Domestic | Lewis Home Furniture | −2,700.00 | Payables | 40000 |

Stage 2 Processing Steps:
3 Since Doc. No. PAYMENT0003 has a Vendor A/c, the program checks Vendor Ledger Entries. Since the Doc. No. PAYMENT0003 is not applied, the program does not proceed further.

Applied Vendor Entries

| Entry No. | Posting Date | Document Type | Document No. | Description | External Document No. | Currency Code | Original Amount | Amount | Closed by Amount |
|---|---|---|---|---|---|---|---|---|---|
| No Application | | | | | | | | | |

CASE 3

Stage 1 Start: General Ledger No. No. PP000003 is identified for inclusion in Cash Basis Accounts by the program as it has a liquid Fund A/c (G/L Account No. 2920)

General Ledger Entry

| Entry No. | Document No. | Posting Date | Document Type | G/L Account No. | Account Name | Description | Amount | Source Type | Source No. | Reversed |
|---|---|---|---|---|---|---|---|---|---|---|
| 33 | PP000003 | Jan. 15, 2020 | Payment | 2920 | Bank, LCY | Customer 10 | 30,800.00 | Bank Account | NBL | FALSE |
| 34 | PP900003 | Jan. 15, 2020 | Payment | 2310 | Customers Domestic | Customer 10 | −30,800.00 | Customer | 10090 | FALSE |

Stage 1 Processing Steps:
1 Entry No. 33 is deleted
2 Entry No. 34 is multiplied by −1 & added to CF Ledger Entry as Entry No. 11 below
Stage 1 Completion: Cash Flow Ledger Entry from General Ledger Entry Cash Flow Ledger Entry

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| 11 | PP000003 | | Jan. 15, 2020 | TRUE | 2310 | Customers Domestic | Customer 10 | 30,800.90 | Receivables | 10000 |

Stage 2 Processing Steps:
1 Since Doc. No. PP000003 has a Vendor A/c, the program checks Vender Ledger Entries to see if it is applied. The program finds that the Doc. No. PP000003 is applied to Doc. No. 103040

Applied Customer Entries

| Entry No. | Posting Date | Document Type | Document No. | Description | Original Amount | Amount | Closed by Amount |
|---|---|---|---|---|---|---|---|
| 32 | Jan. 4, 2020 | Invoice | 103040 | Invoice 1018 | 30,800.00 | 30,800.00 | 30,800.00 |

Processing Steps:
1 Calculated Multiplication Factor (MF) = Applied Amount/Total AR for Doc. No. 103040
2 Create Additional Cash Flow Ledger Entries by multiplying all Entries in Original Doc. No. 103040 by MF Stage 2- Calculate Multiplication Factor from ‘Original’ General Ledger Entry

| Entry No. | Document No. | Posting Date | Document Type | G/L Account No. | Account Name | Description |
|---|---|---|---|---|---|---|
| 30 | 103040 | Jan. 4, 2020 | Invoice | 6710 | Consulting Fees - Dom. | Invoice 1013 |
| 31 | 103040 | Jan. 4, 2020 | Invoice | 5611 | Sales VAT 10% | Invoice 1013 |
| 32 | 103040 | Jan. 4, 2020 | Invoice | 2310 | Customers Domestic | Invoice 1013 |

Stage 2- Calculate Multiplication Factor from ‘Original’ General Ledger Entry

| Entry No. | Amount | Source Type | Source No. | Reversed | Multiplication Factor (MF) | CF Entry Amount (Amount × MF) |
|---|---|---|---|---|---|---|
| 30 | −28,000.00 | Customer | 10000 | FALSE | −1 | 28,000.00 |
| 31 | −2,800.00 | Customer | 10000 | FALSE | −1 | 2,800.00 |
| 32 | 30,800.00 | Customer | 10000 | FALSE | −1 | (30,800.00) |

Stage 2 Completion-Subprocess Creates Additional Cash Flow Ledger Entries

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| 12 | PP000003 | 103040 | Jan. 15, 2020 | TRUE | 6710 | Consulting Fees - Dom. | Customer 10 | 28,000.00 | Receivables | 10000 |
| 13 | PP000003 | 103040 | Jan. 15, 2020 | TRUE | 5611 | Sales VAT 10% | Customer 10 | 2,800.00 | Receivables | 10000 |
| 14 | PP000003 | | Jan. 15, 2020 | TRUE | 2310 | Customers Domestic | Customer 10 | −30,800.00 | Receivables | 10000 |

Complete Reclassified Cash Flow Ledger Entries

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| 11 | PP000003 | | Jan. 15, 2020 | TRUE | 2310 | Customers Domestic | Customer 10 | 30,800.00 | Receivables | 10000 |
| 12 | PP000003 | 103040 | Jan. 15, 2020 | TRUE | 6710 | Consulting Fees - Dom. | Customer 10 | 28,000.00 | Receivables | 10000 |

-continued

| CASE 3 | | | | | | | | | | |
|---|---|---|---|---|---|---|---|---|---|---|
| 13 | PP000003 | 103040 | Jan. 15, 2020 | TRUE | 5611 | Sales VAT 10% | Customer 10 | 2,800.00 | Receivables | 10000 |
| 14 | PP000003 | | Jan. 15, 2020 | TRUE | 2310 | Customers Domestic | Customer 10 | −30,800.00 | Receivables | 10000 |

Explanatory Notes:
1 The Cash Flow A/c No. is the same as General Ledger A/c No for all Entries
2 The Cash Flow Date is the Cash Flow Date for PP000003
3 The Original Doc. No. (from which CF Ledger Entry is derived) is also shown

CASE 4

Stage 1 Start: General Ledger Doc. No. PP000004 is identified for inclusion in Cash Basis Accounts by the program as it has a Liquid Fund A/c (G/L Account No. 2920)

General Ledger Entry

| Entry No. | Document No. | Posting Date | Document Type | G/L Account No. | Account Name | Description | Amount | Source Type | Source No. | Reversed |
|---|---|---|---|---|---|---|---|---|---|---|
| 35 | PP000004 | Jan. 22, 2020 | Payment | 2920 | Bank, LCY | Customer 20 | 50,000.00 | Bank Account | NBL | FALSE |
| 36 | PP000004 | Jan. 22, 2020 | Payment | 2310 | Customers Domestic | Customer 20 | −50,000.00 | Customer | 20000 | FALSE |

Stage 1 Processing Steps:
1 Entry No. 35 is deleted
2 Entry No. 36 is multiplied by −1 & added to CF Ledger Entry as Entry No. 15 below
Stage 1 Completion: Cash Flow Ledger Entry from General ledger Entry Cash Flow Ledger Entry

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| 15 | PP000004 | | Jan. 22, 2020 | FALSE | 2310 | Customers Domestic | Customer 20 | 50,000.00 | Receivables | 20000 |

Stage 2 Processing Steps:
1 Since Doc. No. PP000004 has a Customer A/c, the program checks Customer Ledger Entries to see if this Receipt is applied. Since it is not applied the program does not proceed further.

CASE 5

Stage 1 Start: General Ledger Doc. No. PP000005 is identified for inclusion in Cash Basis Accounts by the program as it has a Liquid Fund A/c (G/L Account No. 2920)

General Ledger Entry

| Entry No. | Document No. | Posting Date | Document Type | G/L Account No. | Account Name | Description | Amount | Source Type | Source No. | Reversed |
|---|---|---|---|---|---|---|---|---|---|---|
| 40 | PP000005 | Jan. 31, 2020 | Payment | 2920 | Bank, LCY | Vendor 65000 | −8,750.00 | Bank Account | NBL | FALSE |
| 41 | PP000005 | Jan. 31, 2020 | Payment | 5410 | Vendors, Domestic | Vendor 65000 | 8,750.00 | Vendor | 62000 | FALSE |

Stage 1 Processing Steps:
1 Entry No. 40 is deleted
2 Entry No. 41 is multiplied by −1 & added to CF Ledger Entry as Entry No. 16 below
Stage 1 Completion: Cash Flow Ledger Entry from General ledger Entry -continued

CASE 5

Cash Flow Ledger Entry

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| 16 | PP000005 | | Jan. 31, 2020 | TRUE | 5410 | Vendors, Domestic | Vendor 62000 | −8,750.00 | Payables | 62000 |

Stage 2 Processing Steps:
1 Since Doc. No. PP000005 has a Customer A/c, the program checks Customer Ledger Entries to see if it is applied. The program finds that the Doc. No.
PP000005 is applied to Doc No. 108064

Applied Customer Entries

| Entry No. | Posting Date | Document Type | Document No. | Description | Original Amount | Amount | Closed by Amount |
|---|---|---|---|---|---|---|---|
| 39 | Jan. 20, 2020 | Invoice | 108064 | Invoice 1029 | −8,750.00 | −8,750.00 | −8,750.00 |

Processing Steps:
1 Calculate Multiplication Factor (MF) = Applied Amount/Total AP for Doc. No. 108062
2 Create Additional Cash Flow Ledger Entries by multiplying all Entries in Original Doc. No. 108064 by MF Stage 2-Calculate Multiplication Factor from ‘Original’ General Ledger Entry

| Entry No. | Document No. | Posting Date | Document Type | G/L Account No. | Account Name | Description |
|---|---|---|---|---|---|---|
| 37 | 108064 | Jan. 23, 2020 | Invoice | 8130 | Repairs and Maintenance | Invoice 1029 |
| 38 | 108064 | Jan. 23, 2020 | Invoice | 5630 | Purchase VAT 25% | Invoice 1029 |
| 39 | 108064 | Jan. 23, 2020 | Invoice | 5410 | Vendors, Domestic | Invoice 1029 |

Stage 2-Calculate Multiplication Factor from ‘Original’ General Ledger Entry

| Entry No. | Amount | Source Type | Source No. | Reversed | Multiplication Factor (MF) | CF Entry Amount (Amount × MF) |
|---|---|---|---|---|---|---|
| 37 | 7,000.00 | Vendor | 6200 | FALSE | −1 | −7000 |
| 38 | 1,750.00 | Vendor | 6200 | FALSE | −1 | −1750 |
| 39 | −8,750.00 | Vendor | 6200 | FALSE | −1 | 8750 |

Stage 2 Completion-Subprocess Creates Additional Cash Flow Ledger Entries

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| 17 | PP000005 | 108064 | Jan. 31, 2020 | TRUE | 8130 | Repairs and Maintenance | Vendor 62000 | −7,000.00 | Payables | 62000 |
| 18 | PP000005 | 108064 | Jan. 31, 2020 | TRUE | 5630 | Purchase VAT 25% | Vendor 62000 | −1,750.00 | Payables | 62000 |
| 19 | PP000005 | | Jan. 31, 2020 | TRUE | 5410 | Vendors, Domestic | Vendor 62000 | 8,750.00 | Payables | 62000 |

Complete Reclassified Cash Flow Ledger Entries

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| 16 | PP000005 | | Jan. 31, 2020 | TRUE | 5410 | Vendors, Domestic | Vendor 62000 | −8,750.00 | Payables | 62000 |
| 17 | PP000005 | 108064 | Jan. 31, 2020 | TRUE | 8130 | Repairs and Maintenance | Vendor 62000 | −7,000.00 | Payables | 62000 |
| 18 | PP000005 | 108064 | Jan. 31, 2020 | TRUE | 5630 | Purchase VAT 25% | Vendor 62000 | −1,750.00 | Payables | 62000 |
| 19 | PP000005 | | Jan. 31, 2020 | TRUE | 5410 | Vendors, Domestic | Vendor 62000 | 8,750.00 | Payables | 62000 |

Explanatory Notes:
1 The Cash Flow A/c No. is the same as General Ledger A/c No for all Entries
2 The Cash Flow Date is the Cash Flow Date for PP000005
3 The Original Doc. No. (from which CF Ledger Entry is derived) is also shown

CASE 6

Stage 1 Start: General Ledger Doc. No. PP000006 is identified for inclusion in Cash Basis Accounts by the program as it has a Liquid Fund A/c (G/L Account No. 2920)

General Ledger Entry

| Entry No. | Document No. | Posting Date | Document Type | G/L Account No. | Account Name | Description |
|---|---|---|---|---|---|---|
| 52 | PP000006 | Feb. 12, 2020 | Payment | 2920 | Bank, LCY | Customer 44 |
| 53 | PP000006 | Feb. 12, 2020 | Payment | 2310 | Customers Dome | Customer 44 |

General Ledger Entry

| Entry No. | Amount | Source Type | Source No. | Reversed | Multiplication Factor (MF) | Cash Flow Amount |
|---|---|---|---|---|---|---|
| 52 | 18,670.25 | Bank Account | NBL | FALSE | | |
| 53 | −18,670.25 | Customer | 44171511 | FALSE | −1 | 18,670.25 |

Stage 1 Processing Steps:
1 Entry No. 52 is deleted
2 Entry No. 53 is multiplied by −1 & added to CF Ledger Entry as Entry No. 20 below
Stage 1 Completion: Cash Flow Ledger Entry from General ledger Entry Cash Flow Ledger Entry

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| 20 | PP000006 | | Feb. 12, 2020 | TRUE | 2310 | Customers Domestic | Customer 44 | 18,670.25 | Receivables | 44171511 |

Stage 2 Processing Steps:
1 Since Doc. No. PP000006 has a Customer A/c, the program checks Customer Ledger Entries to see if it is applied. The program finds that the Doc. No.
PP000005 is applied to Doc. No. 103041

Applied Customer Entries

| Entry No. | Posting Date | Document Type | Document N | Description | Original Amount |
|---|---|---|---|---|---|
| 51 | Jan. 19, 2020 | Invoice | 103041 | Invoice 1019 | 18,670.25 |

Processing Steps:
2 Calculate Multiplication Factor (MF) = Applied Amount/Total AP for Doc. No. 103041
3 Create Additional Cash Flow Ledger Entries by multiplying all Entries in Original Doc. No. 103041 by MF Stage 2-Calculate Multiplication Factor from 'Original' General Ledger Entry

| Entry No. | Document No. | Posting Date | Document Type | G/L Account No. | Account Name | Description |
|---|---|---|---|---|---|---|
| 47 | 103041 | Jan. 19, 2020 | | 2110 | Resale Items | Direct Cost 44171511 |
| 48 | 103041 | Jan. 19, 2020 | | 7190 | Cost of Retail Sol | Direct Cost 44171511 |
| 49 | 103041 | Jan. 19, 2020 | Invoice | 6110 | Sales, Retail - Do | Invoice 1019 |
| 50 | 103041 | Jan. 19, 2020 | Invoice | 5610 | Sales VAT 25% | Invoice 1019 |
| 51 | 103041 | Jan. 19, 2020 | Invoice | 2310 | Customers Dome | Invoice 1019 |

Stage 2-Calculate Multiplication Factor from 'Original' General Ledger Entry

| Entry No. | Amount | Source Type | Source No. | Reversed | Multiplication Factor (MF) | CF Entry Amount (Amount × MF) |
|---|---|---|---|---|---|---|
| 47 | −11,500.00 | | | FALSE | | |
| 48 | 11,500.00 | | | FALSE | | |
| 49 | −14,936.20 | Customer | 44171511 | FALSE | −1 | 14,936.20 |
| 50 | −3,734.05 | Customer | 44171511 | FALSE | −1 | 3,734.05 |
| 51 | 18,670.25 | Customer | 44171511 | FALSE | −1 | (18,670.25) |

Stage 2 Completion-Subprocess Creates Additional Cash Flow Ledger Entries

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| 21 | PP000006 | 103041 | Feb. 12, 2020 | TRUE | 6110 | Sales, Retail - Dom. | Customer 44 | 14,936.20 | Receivables | 44171511 |
| 22 | PP000006 | 103041 | Feb. 12, 2020 | TRUE | 5610 | Sales VAT 25% | Customer 44 | 3,734.05 | Receivables | 44171511 |

-continued

CASE 6

| | | | | | | | | | | |
|---|---|---|---|---|---|---|---|---|---|---|
| 23 | PP000006 | | Feb. 12, 2020 | TRUE | 2310 | Customers Domestic | Customer 44 | −18,670.25 | Receivables | 44171511 |

Complete Reclassified Cash Flow Ledger Entries

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| 20 | PP000006 | | Feb. 12, 2020 | TRUE | 2310 | Customers Domestic | Customer 44 | 18,670.25 | Receivables | 44171511 |
| 21 | PP000006 | 103041 | Feb. 12, 2020 | TRUE | 6110 | Sales, Retail - Dom. | Customer 44 | 14,936.20 | Receivables | 44171511 |
| 22 | PP000006 | 103041 | Feb. 12, 2020 | TRUE | 5610 | Sales VAT 25% | Customer 44 | 3,734.05 | Receivables | 44171511 |
| 23 | PP000006 | | Feb. 12, 2020 | TRUE | 2310 | Customers Domestic | Customer 44 | −18,670.25 | Receivables | 44171511 |

Explanatory Notes:
1 The Cash Flow A/c No. is the same as General Ledger A/c No for all Entires
2 The Cash Flow Date is the Cash Flow Date for PP000006
3 The Original Doc. No. (from which CF Ledger Entry is derived) is also shown

CASE 7

Stage 1 Start: General Ledger Doc. No. PP000007 is identified for inclusion in Cash Basis Accounts by the program as it has a Liquid Fund A/c (G/L Account No. 2920)

General Ledger Entry

| Entry No. | Document No. | Posting Date | Document Type | G/L Accou | Account Name | Description | Amount | Source Type | Source No. | Reversed |
|---|---|---|---|---|---|---|---|---|---|---|
| 62 | PP000007 | Feb. 23, 2020 | Payment | 2920 | Bank, LCY | Drawing by Owner | −57,000.00 | Bank Account | NBL | FALSE |
| 62 | PP000007 | Feb. 23, 2020 | Payment | 3120 | Retained Earnings | Drawing by Owner | 57,000.00 | Bank Account | NBL | FALSE |

Stage 1 Processing Steps:
1 Entry No. 62 is deleted
2 Entry No. 62 is multiplied by −1 & added to CF Ledger Entry as Entry No. 20 below Step 1-Cash Flow Ledger Entry

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| PP000007 | | Feb. 23, 2020 | FALSE | 3120 | Retained Earnings | Drawing by Owner | −57,000.00 | Liquid Funds | NBL | 24 |

Stage 2: As Doc. No. PP000007 does not have an A/R or A/P Account, the program does not go to Stage 2

CASE 8

Stage 1 Start: General Ledger Doc. No. PP000002 is identified for inclusion in Cash Basis Accounts by the program as it has a Liquid Fund A/c General Ledger Entry

| Entry No. | Document No. | Posting Date | Document Type | G/L Account No. | Account Name | Description | Amount | Source Type | Source No. | Reversed |
|---|---|---|---|---|---|---|---|---|---|---|
| 21 | PP000002 | Dec. 8, 2020 | Payment | 2920 | Bank, LCY | WalkerHolland | (32,750.00) | Bank Account | NBL | FALSE |
| 22 | PP000002 | Dec. 8, 2020 | Payment | 5410 | Vendors, Domestic | WalkerHolland | 32,750.00 | Vendor | 62000 | FALSE |

Stage 1 Processing Steps:
1. Entry No. 21 is deleted
2. Entry No. 22 is multiplied by −1 & added to CF Ledger Entry as Entry No. 7 below
Stage 1 Completion: Cash Flow Ledger Entry from Payment General ledger Entry -continued

CASE 8

Cash Flow Ledger Entry

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| 7 | PP000002 | | Dec. 8, 2020 | TRUE | 3410 | Vendors, Domestic | WalkerHolland | (32,750.00) | Payables | 62000 |

Stage 2 Processing Steps:
3. Since Doc. No. PP000002 has a Vendor A/c, the program checks Vendor Ledger Entries and finds payment is applied to Doc. No. 108062

Applied Vendor Ledger Entries

| Entry No. | Posting Date | Document Type | Document No. | Description | Original Amount | Amount |
|---|---|---|---|---|---|---|
| 18 | Dec. 8, 2020 | Invoice | 108062 | Invoice 1025 | (43,750.00) | (43,750.00) |

Processing Steps:
1. Calculate Multiplication Factor (MF) = Applied Amount/Total AP for Doc. No. 108062
2. Create Additional Cash Flow Ledger Entries by multiplying all Entries in Original Doc. No. 108062 by MF Stage 2- Calculate Multiplication Factor from 'Original' General Ledger Entry

| Entry No. | Document No. | Posting Date | Document Type | G/L Account No. | Account Name | Description |
|---|---|---|---|---|---|---|
| 16 | 108062 | Dec. 8, 2020 | Invoice | 1220 | Increases during the Year | Invoice 1025 |
| 17 | 108062 | Dec. 8, 2020 | Invoice | 5630 | Purchase VAT 25% | Invoice 1025 |
| 18 | 108062 | Dec. 8, 2020 | Invoice | 5410 | Vendors, Domestic | Invoice 1025 |

Stage 2- Calculate Multiplication Factor from 'Original' General Ledger Entry

| Entry No. | Amount | Source Type | Source No. | Reversed | Multiplication Factor (MF) | CF Entry Amount (Amount × MF) |
|---|---|---|---|---|---|---|
| 16 | 35,000.00 | Fixed Asset | FA000090 | FALSE | −0.748571429 | −26,200.00 |
| 17 | 8,750.00 | Fixed Asset | FA000090 | FALSE | −0.748571429 | −6,550.00 |
| 18 | (43,750.00) | Vendor | 62000 | FALSE | −0.748571429 | 32,750.00 |

Stage 2 Completion-Subprocess Creates Additional Cash Flow Ledger Entries

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| 8 | PP000002 | 108062 | Dec. 8, 2020 | TRUE | 1220 | Increases during the Year | WalkerHolland | (26,200.00) | Payables | 62000 |
| 9 | PP000002 | 108062 | Dec. 8, 2020 | TRUE | 5630 | Purchase VAT 25% | WalkerHolland | (6,550.00) | Payables | 62000 |
| 10 | PP000002 | | Dec. 8, 2020 | TRUE | 5410 | Vendors, Domestic | WalkerHolland | 32,750.00 | Payables | 62000 |

Complete Reclassified Cash Flow Ledger Entries

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| 7 | PP000002 | | Dec. 8, 2020 | TRUE | 5410 | Vendors, Domestic | WalkerHolland | −32,750.00 | Payables | 62000 |
| 8 | PP000002 | 108062 | Dec. 8, 2020 | TRUE | 1220 | Increases during the Year | WalkerHolland | −26,200.00 | Payables | 62000 |
| 9 | PP000002 | 108062 | Dec. 8, 2020 | TRUE | 5630 | Purchase VAT 25% | WalkerHolland | −6,550.00 | Payables | 62000 |
| 10 | PP000002 | | Dec. 8, 2020 | TRUE | 5410 | Vendors, Domestic | WalkerHolland | 32,750.00 | Payables | 62000 |

Explanatory Notes:
The Cash Flow A/c No. is the same as General Ledger A/c No.
The Cash Flow Date is the Cash Flow Date for PP000002
The Original Doc. No. (from which CF Ledger Entry is derived) is also

| CASE 9 | | | | | | | | | | |
|---|---|---|---|---|---|---|---|---|---|---|
| Entry No. | Document No. | Posting Date | Document Type | G/L Account No. | Account Name | Description | Amount | Source Type | Source No. | Reversed |
| 14 | PP000001 | Dec. 9, 2020 | Payment | 1920 | Bank, LCY | London Postmaster | −1,520.00 | Bank Account | NBL | FALSE |
| 15 | PP000001 | Dec. 9, 2020 | Payment | 5410 | Vendors, Domestic | London Postmaster | 1,520.00 | Vendor | 10000 | FALSE |

Stage 1 Processing Steps:
1 Entry No. 14 is deleted
2 Entry No. 15 is multiplied by −1 & added to CF Ledger Entry as Entry No. 3 below

| Cash Flow Ledger Entry | | | | | | | | | | |
|---|---|---|---|---|---|---|---|---|---|---|
| Entry No. | Document No. | Original Doc. No. | Cash Flow Date | Reclassify | Cash Flow Account No. | Account Name | Description | Amount (LCY) | Source Type | Source No. |
| 3 | PP000001 | | Dec. 9, 2020 | TRUE | 5410 | Vendors, Domestic | London Postmaster | −1,520.00 | Payables | 10000 |

Stage 2 Processing Steps:
3 Since Doc. No. PP000001 has a Vendor A/c, the program checks Vendor Ledger Entries to see if it is applied. The program finds the the Doc. No. PP000001 is applied to Doc. No. 108061

| Applied Vendor Ledger Entries | | | | | | |
|---|---|---|---|---|---|---|
| Entry No. | Posting Date | Document Type | Document No. | Description | Original Amount | Amount |
| 13 | Dec. 7, 2020 | Invoice | 108061 | Order 106037 | −6,1175.00 | −6,1175.00 |

Processing Steps:
1 Calculate Multiplication Factor (MF) = Applied Amount/Total AP for Doc. No. 108061
2 Create Additional Cash Flow Ledger Entries by multiplying all Entries in Original Doc. No. 108061 by MF
3 Entries which do not have Source Type are not processed (Entry No. 26 & 27)

| Stage 2- Calculate Multiplication Factor from ‘Original’ General Ledger Entry | | | | | | |
|---|---|---|---|---|---|---|
| Entry No. | Document No. | Posting Date | Document Type | G/L Account No. | Account Name | Description |
| 26 | 108061 | Dec. 7, 2020 | | 2110 | Resale Items | Direct Cost 10000 on Dec. 7, 2020 |
| 27 | 108061 | Dec. 7, 2020 | | 7191 | Direct Cost Applied, | Direct Cost 10000 on Dec. 7, 2020 |
| 11 | 108061 | Dec. 7, 2020 | Invoice | 7110 | Purch, Retail - Dom. | Order 106037 |
| 12 | 108061 | Dec. 7, 2020 | Invoice | 5830 | Purchase VAT 25% | Order 106037 |
| 13 | 108061 | Dec. 7, 2020 | Invoice | 5410 | Vendors, Domestic | Order 106037 |

| Stage 2- Calculate Multiplication Factor from ‘Original’ General Ledger Entry | | | | | | |
|---|---|---|---|---|---|---|
| Entry No. | Amount | Source Type | Source No. | Reversed | Multiplication Factor (MF) | CF Entry Amount (Amount × MF) |
| 26 | 5,500.00 | | | FALSE | | |
| 27 | −5,500.00 | | | FALSE | | |
| 11 | 5,500.00 | Vendor | 10000 | FALSE | −0.221090909 | (1,216.00) |
| 12 | 1,375.00 | Vendor | 10000 | FALSE | −0.221090909 | (304.00) |
| 13 | −6,875.00 | Vendor | 10000 | FALSE | −0.221090909 | 1,520.00 |

| Stage 2 Completion-Subprocess Creates Additional Cash Flow Ledger Entries | | | | | | | | | | |
|---|---|---|---|---|---|---|---|---|---|---|
| Entry No. | Document No. | Original Doc. No. | Cash Flow Date | Reclassify | Cash Flow Account No. | Account Name | Description | Amount (LCY) | Source Type | Source No. |
| 4 | PP000001 | 108061 | Dec. 9, 2020 | TRUE | 7110 | Purch, Retail - Dom. | London Postmaster | −1,216.00 | Payables | 10000 |
| 5 | PP000001 | 108061 | Dec. 9, 2020 | TRUE | 5830 | Purchase VAT 25% | London Postmaster | −304.00 | Payables | 10000 |
| 6 | PP000001 | | Dec. 9, 2020 | TRUE | 5410 | Vendors, Domestic | London Postmaster | 1,520.00 | Payables | 10000 |

-continued

| CASE 9 | | | | | | | | | | |
|---|---|---|---|---|---|---|---|---|---|---|
| Complete Reclassified Cash Flow Ledger Entries | | | | | | | | | | |
| Entry No. | Document No. | Original Doc. No. | Cash Flow Date | Reclassify | Cash Flow Account No. | Account Name | Description | Amount (LCY) | Source Type | Source No. |
| 3 | PP000001 | | Dec. 9, 2020 | TRUE | 5410 | Vendors, Domestic | London Postmaster | −1,520.00 | Payables | 10000 |
| 4 | PP000001 | 108061 | Dec. 9, 2020 | TRUE | 7110 | Purch, Retail - Dom. | London Postmaster | −1,216.00 | Payables | 10000 |
| 5 | PP000001 | 108061 | Dec. 9, 2020 | TRUE | 5830 | Purchase VAT 25% | London Postmaster | −304.00 | Payables | 10000 |
| 6 | PP000001 | | Dec. 9, 2020 | TRUE | 5410 | Vendors, Domestic | London Postmaster | 1,520.00 | Payables | 10000 |

Explanatory Notes:
1 The Cash Flow A/c No. is the same as General Ledger A/c No for all Entries
2 The Cash Flow Date is the Cash Flow Date for PP000001
3 The Original Doc. No. (from which CF Ledger Entry is derived) is also shown

CASE 10

Stage 1 Start: General Ledger Doc. No. PP000008 is identified for inclusion in Cash Basis Accounts by the program as it has a Liquid Fund A/c General Ledger Entry

| Entry No. | Document No. | Posting Date | Document | G/L Account | Account Name | Description | Amount | Source Type | Source No. | Reversed |
|---|---|---|---|---|---|---|---|---|---|---|
| 73 | PP000008 | Feb. 27, 2021 | Payment | 2920 | Bank, LCY | Boybridge Tool Mart | −19,000.00 | Bank Account | NBL | FALSE |
| 74 | PP000008 | Feb. 27, 2021 | Payment | 5410 | Vendors, Domestic | Boybridge Tool Mart | 19,000.00 | Vendor | 44729910 | FALSE |

Stage 1 Processing Steps:
1 Entry No. 73
2 Entry No. 74 is multiplied by I & added to CP Lodger Entry as Entry No. 25 below Stage 1 Completion: Cash Flow Ledger Entry from General ledger Entry

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| 25 | PP000008 | | Feb. 27, 2021 | TRUE | 5410 | Vendors, Domestic | Boybridge Tool Mart | −19,000.00 | Payables | 44729910 |

Stage 2 Processing Steps:
3 Since Doc. No. PP000008 has a Vendor A/c, the program checks Vendor Ledger Entries to see if it is applied. The program finds that the Doc. No. PP000008 is applied to Doc. No. 108066

Applied Ledger Entries

| Entry No. | Posting Date | Document T | Document | Description | Original Amount |
|---|---|---|---|---|---|
| 69 | Feb. 9, 2021 | Invoice | 108066 | Invoice 1030 | −24,333.88 |
| 72 | Feb. 15, 2021 | Invoice | 108067 | Invoice 1031 | −12,100.00 |

Processing Steps:
1 Calculated Multiplication Lector (MF) = Applied Amount/Total AP tor Doc. No. 108066 and separately for Doc. No. 108067
2 Create Additional Cash Flow Ledger Entries by multiplying all Entries in Original Doc. No. 108066 & 108067 by respective MF Stage 2- Calculate Multiplication Factor from 'Original' General Ledger Entry

| Entry No. | Document No. | Posting Date | Document Type | G/L Account No. | Account Name | Description |
|---|---|---|---|---|---|---|
| 63 | 108066 | Feb. 9, 2021 | | 2120 | Finished Goods | Direct Cost 44729910 on Mar. 9, 2021 |
| 64 | 108066 | Feb. 9, 2021 | | 7181 | Direct Cost Applied, Retail | Direct Cost 44729910 on Mar. 9, 2021 |
| 65 | 108066 | Feb. 9, 2021 | Invoice | 7110 | Purch., Retail - Dom. | Invoice 1030 |
| 66 | 108066 | Feb. 9, 2021 | Invoice | 5630 | Purchase VAT 25% | Invoice 1030 |
| 67 | 108066 | Feb. 9, 2021 | Invoice | 8130 | Repairs and Maintenance | Invoice 1030 |
| 68 | 108066 | Feb. 9, 2021 | Invoice | 5630 | Purchase VAT 25% | Invoice 1030 |
| 69 | 108066 | Feb. 9, 2021 | Invoice | 5410 | Vendors, Domestic | Invoice 1030 |
| 70 | 108067 | Feb. 15, 2021 | Invoice | 6710 | Consulting Fees - Dom. | Invoice 1031 |
| 71 | 108067 | Feb. 15, 2021 | Invoice | 5631 | Purchase VAT 10% | Invoice 1031 |
| 72 | 108067 | Feb. 15, 2021 | Invoice | 5410 | Vendors, Domestic | Invoice 1031 |

-continued

CASE 10

Stage 2- Calculate Multiplication Factor from 'Original' General Ledger Entry

| Entry No. | Amount | Source Type | Source No. | Reversed | Multiplication Factor (MF) | Amount of CF Entry (Amount × MF) |
|---|---|---|---|---|---|---|
| 63 | 12,967.10 | | | FALSE | | |
| 64 | −12,967.10 | | | FALSE | | |
| 65 | 12,967.10 | Vendor | 44729910 | FALSE | 0.4109497 | 5,328.83 |
| 66 | 3,241.75 | Vendor | 44729910 | FALSE | 0.4109497 | 1,332.21 |
| 67 | 8,500.00 | Vendor | 44729910 | FALSE | 0.4109497 | 2,671.17 |
| 68 | 1,625.00 | Vendor | 44729910 | FALSE | 0.4109497 | 667.79 |
| 69 | −24,333.88 | Vendor | 44729910 | FALSE | 0.4109497 | (10,000.00) |
| 70 | 11,000.00 | Vendor | 44729910 | FALSE | 0.495867769 | 5,454.55 |
| 71 | 1,100.00 | Vendor | 44729910 | FALSE | 0.495867769 | 545.45 |
| 72 | −12,100.00 | Vendor | 44729910 | FALSE | 0.495867769 | (6,000.00) |

Stage 2 Completion-Subprocess Creates Additional Cash Flow Ledger Entries

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| 25 | PP000008 | | Mar. 27, 2021 | TRUE | 5410 | Vendors, Domestic | Boybridge Tool Mart | −19,000.0 | Payables | 44729910 |
| 26 | PP000008 | 108066 | Mar. 27, 2021 | TRUE | 7110 | Purch., Retail - Dom. | Boybridge Tool Mart | −5,328.83 | Payables | 44729910 |
| 27 | PP000008 | 108066 | Mar. 27, 2021 | TRUE | 5630 | Purchase VAT 25% | Boybridge Tool Mart | −1,332.23 | Payables | 44729910 |
| 28 | PP000008 | 108066 | Mar. 27, 2021 | TRUE | 8130 | Repairs and Maintenance | Boybridge Tool Mart | −2,671.17 | Payables | 44729910 |
| 29 | PP000008 | 108066 | Mar. 27, 2021 | TRUE | 5630 | Purchase VAT 25% | Boybridge Tool Mart | −667.79 | Payables | 44729910 |
| 30 | PP000008 | | Mar. 27, 2021 | TRUE | 6710 | Consulting Fees - Dom. | Boybridge Tool Mart | −5,454.55 | Payables | 44729910 |
| 31 | PP000008 | 108067 | Mar. 27, 2021 | TRUE | 5631 | Purchase VAT 10% | Boybridge Tool Mart | −545.45 | Payables | 44729910 |
| 32 | PP000008 | | Mar. 27, 2021 | TRUE | 5410 | Vendors, Domestic | Boybridge Tool Mart | 16,000.00 | Payables | 44729910 |

Complete Reclassified Cash Flow Ledger Entries

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| 25 | PP000008 | | Mar. 27, 2021 | TRUE | 5410 | Vendors, Domestic | Boybridge Tool Mart | −19,000.0 | Payables | 44729910 |
| 26 | PP000008 | 108066 | Mar. 27, 2021 | TRUE | 7210 | Purch., Retail - Dom. | Boybridge Tool Mart | −5,328.83 | Payables | 44729910 |
| 27 | PP000008 | 108066 | Mar. 27, 2021 | TRUE | 5630 | Purchase VAT 25% | Boybridge Tool Mart | −1,332.23 | Payables | 44729910 |
| 28 | PP000008 | 108066 | Mar. 27, 2021 | TRUE | 8130 | Repairs and Maintenance | Boybridge Tool Mart | −2,671.17 | Payables | 44729910 |
| 29 | PP000008 | 108066 | Mar. 27, 2021 | TRUE | 5630 | Purchase VAT 25% | Boybridge Tool Mart | −667.79 | Payables | 44729910 |
| 30 | PP000008 | 108067 | Mar. 27, 2021 | TRUE | 6710 | Consulting Fees - Dom. | Boybridge Tool Mart | −5,454.55 | Payables | 44729910 |
| 31 | PP000008 | 108067 | Mar. 27, 2021 | TRUE | 5631 | Purchase VAT 10% | Boybridge Tool Mart | −545.45 | Payables | 44729910 |
| 32 | PP000008 | | Mar. 27, 2021 | TRUE | 5410 | Vendors, Domestic | Boybridge Tool Mart | 16,000.00 | Payables | 44729910 |

1 The Cash Flow A/c No. is the same as General Ledger A/c No for all Entries
2 The Cash Flow Date is the Cash Flow Date for PP000008
3 The Original Doc. No. (from which CF Ledger Entry is derived) is also shown

CASE 11

Stage 1 Start: General Ledger Doc. No. PP000009 is identified for inclusion in Cash Basis Accounts by the program as it has a Liquid Fund A/c General Ledger Entry

| Entry No. | Document No. | Posting Date | Document Type | G/L Account No. | Account Name | Description | Amount | Source Type | Source No. | Reversed |
|---|---|---|---|---|---|---|---|---|---|---|
| 85 | PP000009 | Mar. 27, 2021 | Payment | 2920 | Bank, LCY | Fairway Sound | 70,000.00 | Bank Account | NBL | FALSE |

-continued

| CASE 11 | | | | | | | | | | |
|---|---|---|---|---|---|---|---|---|---|---|
| 86 | PP000009 | Mar. 27, 2021 | Payment | 2320 | Customers, Domestic | Fairway Sound | −70,000.00 | Customer | 61000 | FALSE |

Stage 1 Processing Steps:
1 Entry No. 85 is deleted
2 Entry No. 86 is multiplied by −1 & added to CF Ledger Entry as Entry No. 25 below
Stage 1 Completion: Cash Flow Ledger Entry from General ledger Entry

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| 33 | PP000009 | | Mar. 27, 2021 | TRUE | 2310 | Customers Domestic | Fairway Sound | 70,000.00 | Receivables | 61000 |

Stage 2 Processing Steps:
3 Since Doc. No. PP000009 has a Customer A/c, the program checks Customer Ledger Entries to see if it is applied. The program finds that the Doc. No.
PP000009 is applied to Doc. No. 103042 & 103043

Applied Customer Entries

| Document | Posting Date | Document Type | Description | Currency Cod | Original Amount | Amount | Closed by Amount | Entry No. |
|---|---|---|---|---|---|---|---|---|
| 103042 | Mar. 9, 2022 | Invoice | Invoice 1020 | | 54,700.00 | 54,700.00 | 54,700.00 | 81 |
| 103043 | Mar. 15, 2022 | Invoice | Invoice 1021 | | 5,625.00 | 5,625.00 | 5,625.00 | 84 |

Processing Steps:
1 Calculate Multiplication Factor (MF) = Applied Amount/Total AP for Doc. No. 103042 and separately for Doc. No. 103043
2 Create Additional Cash Flow Ledger Entries by multiplying all Entries in Original Doc. No. 1083042 & 103043 by respective MF
3 Entries which do not have Source Type are not processed (Entry No. 75 & 76)

Stage 2-Calculate Multiplication Factor from ‘Original’ General Ledger Entry

| Entry No. | Document No. | Posting Date | Document Type | G/L Account No. | Account Name | Description |
|---|---|---|---|---|---|---|
| 75 | 103042 | Mar. 9, 2021 | | 2120 | Finished Goods | Direct Cost 61000 on Mar. 9, 2021 |
| 76 | 103042 | Mar. 9, 2021 | | 7190 | Cost of Retail Sold | Direct Cost 61000 on Mar. 9, 2021 |
| 77 | 103042 | Mar. 9, 2021 | Invoice | 8110 | Sales, Retail - Dom. | Invoice 1020 |
| 78 | 103042 | Mar. 9, 2021 | Invoice | 5610 | Sales VAT 25% | Invoice 1020 |
| 79 | 103042 | Mar. 9, 2021 | Invoice | 6710 | Consulting Fees - Dom. | Invoice 1020 |
| 80 | 103042 | Mar. 9, 2021 | Invoice | 5611 | Sales VAT 10% | Invoice 1020 |
| 81 | 103042 | Mar. 9, 2021 | Invoice | 2310 | Customers Domestic | Invoice 1020 |
| 82 | 103043 | Mar. 15, 2021 | Invoice | 6810 | Fees and Charges Rec. - Dom. | Invoice 1021 |
| 83 | 103043 | Mar. 15, 2021 | Invoice | 5610 | Sales VAT 25% | Invoice 1021 |
| 84 | 103043 | Mar. 15, 2021 | Invoice | 2310 | Customers Domestic | Invoice 1021 |

Stage 2-Calculate Multiplication Factor from ‘Original’ General Ledger Entry

| Entry No. | Amount | Source Type | Source No. | Reversed | Multiplication Factor (MF) | Amount of CF Entry (Amount × MF) |
|---|---|---|---|---|---|---|
| 75 | −2,593.42 | | | FALSE | | |
| 76 | 2,593.42 | | | FALSE | | |
| 77 | −20,000.00 | Customer | 61000 | FALSE | −1 | 20000 |
| 78 | −5,000.00 | Customer | 61000 | FALSE | −1 | 5000 |
| 79 | −27,000.00 | Customer | 61000 | FALSE | −1 | 27000 |
| 80 | −2,700.00 | Customer | 61000 | FALSE | −1 | 2700 |
| 81 | 54,700.000 | Customer | 61000 | FALSE | −1 | −54700 |
| 82 | −4,500.000 | Customer | 61000 | FALSE | −1 | 4500 |
| 83 | −1,125.00 | Customer | 61000 | FALSE | −1 | 1125 |
| 84 | 5,625.00 | Customer | 61000 | FALSE | −1 | 5625 |

Stage 2 Completion-Subprocess Creates Additional Cash Flow Ledger Entries

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| 34 | PP000009 | 103042 | Mar. 27, 2021 | TRUE | 6110 | Sales, Retail - Dom. | Fairway Sound | 20,000.00 | Receivables | 61000 |
| 35 | PP000009 | 103042 | Mar. 27, 2021 | TRUE | 5610 | Sales VAT 25% | Fairway Sound | 5,000.00 | Receivables | 61000 |
| 36 | PP000009 | 103042 | Mar. 27, 2021 | TRUE | 6710 | Consulting Fees - Dom. | Fairway Sound | 27,000.00 | Receivables | 61000 |

-continued

| Entry No. | Document No. | Original Doc. No. | Cash Flow Date | Reclassify | Cash Flow Account No. | Account Name | Description | Amount (LCY) | Source Type | Source No. |
|---|---|---|---|---|---|---|---|---|---|---|
| CASE 11 | | | | | | | | | | |
| 37 | PP000009 | 103042 | Mar. 27, 2021 | TRUE | 5811 | Sales VAT 10% | Fairway Sound | 2,700.00 | Receivables | 61000 |
| 38 | PP000009 | 103043 | Mar. 27, 2021 | TRUE | 6810 | Fees and Charges Rec. - Dom. | Fairway Sound | 2,100.00 | Receivables | 61000 |
| 39 | PP000009 | 103043 | Mar. 27, 2021 | TRUE | 5610 | Sales VAT 25% | Fairway Sound | 525.00 | Receivables | 61000 |
| 40 | PP000009 | | Mar. 27, 2021 | TRUE | 2310 | Customers Domestic | Fairway Sound | −57,325.00 | Receivables | 61000 |
| Complete Reclassified Cash Flow Ledger Entries | | | | | | | | | | |
| 33 | PP000009 | | Mar. 27, 2021 | TRUE | 2310 | Customers Domestic | Fairway Sound | 70,000.00 | Receivables | 61000 |
| 34 | PP000009 | 103042 | Mar. 27, 2021 | TRUE | 6110 | Sales, Retail - Dom. | Fairway Sound | 20,000.00 | Receivables | 61000 |
| 35 | PP000009 | 103042 | Mar. 27, 2021 | TRUE | 5610 | Sales VAT 25% | Fairway Sound | 5,000.00 | Receivables | 61000 |
| 36 | PP000009 | 103042 | Mar. 27, 2021 | TRUE | 6710 | Consulting Fees - Dom. | Fairway Sound | 27,000.00 | Receivables | 61000 |
| 37 | PP000009 | 103042 | Mar. 27, 2021 | TRUE | 5611 | Sales VAT 10% | Fairway Sound | 2,700.00 | Receivables | 61000 |
| 38 | PP000009 | 103043 | Mar. 27, 2021 | TRUE | 6810 | Fees and Charges Rec. - Dom. | Fairway Sound | 2,100.00 | Receivables | 61000 |
| 39 | PP000009 | 103043 | Mar. 27, 2021 | TRUE | 5610 | Sales VAT 25% | Fairway Sound | 525.00 | Receivables | 61000 |
| 40 | PP000009 | | Mar. 27, 2021 | TRUE | 2310 | Customers Domestic | Fairway Sound | −57,325.00 | Receivables | 61000 |

1 The Cash Flow A/c No. is the same as General Ledger A/c No for all Entries
2 The Cash Flow Date is the Cash Flow Date for PP000009
3 The Original Doc. No. (from which CF Ledger Entry is derived) is also shown The cash flow ledger entries created from the conversion process implemented by system 100 are shown in in the following table:

| Document No. | Entry No. | Original Doc. No | Cash Flow | Reclassify | Cash Flow | Account Name | Description | Amount (LCY) | Source Type | Source No. |
|---|---|---|---|---|---|---|---|---|---|---|
| PAYMENT0001 | 1 | | Jan. 1, 2020 | FALSE | 3110 | Capital Stock | Contribution of cash capital | 1,000,000.00 | Liquid Funds | NBL |
| PAYMENT0003 | 2 | | Jan. 2, 2020 | FALSE | 5410 | Vendors, Domestic | Lewis Home Furniture | −2,700.00 | Payables | 40000 |
| PP000001 | 3 | | Dec. 9, 2020 | TRUE | 5410 | Vendors, Domestic | London Postmaster | −1,520.00 | Payables | 10000 |
| PP000001 | 4 | 108061 | Dec. 9, 2020 | TRUE | 7110 | Purch., Retail - Dom. | London Postmaster | −1,216.00 | Payables | 10000 |
| PP000001 | 5 | 108061 | Dec. 9, 2020 | TRUE | 5630 | Purchase VAT 25% | London Postmaster | −304.00 | Payables | 10000 |
| PP000001 | 6 | | Dec. 9, 2020 | TRUE | 5410 | Vendors, Domestic | London Postmaster | 1,520.00 | Payables | 10000 |
| PP000002 | 7 | | Dec. 8, 2020 | TRUE | 5410 | Vendors, Domestic | WalkerHolland | −32,750.00 | Payables | 62000 |
| PP000002 | 8 | 108062 | Dec. 8, 2020 | TRUE | 1220 | Increases during the Year | WalkerHolland | −26,200.00 | Payables | 62000 |
| PP000002 | 9 | 108062 | Dec. 8, 2020 | TRUE | 5630 | Purchase VAT 25% | WalkerHolland | −6,550.00 | Payables | 62000 |
| PP000003 | 10 | | Dec. 8, 2020 | TRUE | 5410 | Vendors, Domestic | WalkerHolland | 32,750.00 | Payables | 62000 |
| PP000003 | 11 | | Jan. 15, 2020 | TRUE | 2310 | Customers Domestic | Customer 10 | 30,800.00 | Receivables | 10000 |
| PP000003 | 12 | 103040 | Jan. 15, 2020 | TRUE | 6710 | Consulting Fees - Dom. | Customer 10 | 28,000.00 | Receivables | 10000 |
| PP000003 | 13 | 103040 | Jan. 15, 2020 | TRUE | 5611 | Sales VAT 10% | Customer 10 | 2,800.00 | Receivables | 10000 |
| PP000003 | 14 | | Jan. 15, 2020 | TRUE | 2310 | Customers Domestic | Customer 10 | −30,800.00 | Receivables | 10000 |
| PP000004 | 15 | | Jan. 22, 2020 | FALSE | 2310 | Customers Domestic | Customer 10 | 50,000.00 | Receivables | 20000 |

-continued

| Document No. | Entry No. | Original Doc. No | Cash Flow | Reclassify | Cash Flow | Account Name | Description | Amount (LCY) | Source Type | Source No. |
|---|---|---|---|---|---|---|---|---|---|---|
| PP000005 | 16 | | Jan. 31, 2020 | TRUE | 5410 | Vendors, Domestic | Vendor 62000 | −8,750.00 | Payables | 62000 |
| PP000005 | 17 | 108064 | Jan. 31, 2020 | TRUE | 8130 | Repairs and Maintenance | Vendor 62000 | −7,000.00 | Payables | 62000 |
| PP000005 | 18 | 108064 | Jan. 31, 2020 | TRUE | 5630 | Purchase VAT 25% | Vendor 62000 | −1,750.00 | Payables | 62000 |
| PP000005 | 19 | | Jan. 31, 2020 | TRUE | 5410 | Vendors, Domestic | Vendor 62000 | 8,750.00 | Payables | 62000 |
| PP000006 | 20 | | Feb. 12, 2020 | TRUE | 2310 | Customers Domestic | Customer 44 | 18,670.25 | Receivables | 44171511 |
| PP000006 | 21 | 103041 | Feb. 12, 2020 | TRUE | 6110 | Sales, Retail - Dom. | Customer 44 | 14,936.20 | Receivables | 44171511 |
| PP000006 | 22 | 103041 | Feb. 12, 2020 | TRUE | 5610 | Sales VAT 25% | Customer 44 | 3,734.05 | Receivables | 44171511 |
| PP000006 | 23 | | Feb. 12, 2020 | TRUE | 2310 | Customers Domestic | Customer 44 | −13,670.25 | Receivables | 44171511 |
| PP000007 | 24 | | Feb. 23, 2020 | FALSE | 3120 | Retained Earnings | Drawing by Owner | −57,000.00 | Liquid Funds | NBL |
| PP000008 | 25 | | Feb. 27, 2021 | TRUE | 5410 | Vendors, Domestic | Boybridge Tool Mart | −10,000.00 | Payables | 44729910 |
| PP000008 | 26 | 108066 | Feb. 27, 2021 | TRUE | 7110 | Purch., Retail - Dom. | Boybridge Tool Mart | −5,328.83 | Payables | 44729910 |
| PP000008 | 27 | 108066 | Feb. 27, 2021 | TRUE | 5630 | Purchase VAT 25% | Boybridge Tool Mart | −1,332.21 | Payables | 44729910 |
| PP000008 | 28 | 108066 | Feb. 27, 2021 | TRUE | 8130 | Repairs and Maintenance | Boybridge Tool Mart | −2,671.17 | Payables | 44729910 |
| PP000008 | 29 | 108066 | Feb. 27, 2021 | TRUE | 5630 | Purchase VAT 25% | Boybridge Tool Mart | −667.70 | Payables | 44729910 |
| PP000008 | 30 | 108067 | Feb. 27, 2021 | TRUE | 6710 | Consulting Fees - Dom. | Boybridge Tool Mart | −5,354.55 | Payables | 44729910 |
| PP000008 | 31 | 108067 | Feb. 27, 2021 | TRUE | 5631 | Purchase VAT 10% | Boybridge Tool Mart | −545.45 | Payables | 44729910 |
| PP000008 | 32 | | Feb. 27, 2021 | TRUE | 5410 | Vendors, Domestic | Boybridge Tool Mart | 16,000.00 | Payables | 44729910 |
| PP000009 | 33 | | Mar. 27, 2021 | TRUE | 2310 | Customers Domestic | Fairway Sound | 70,000.00 | Receivables | 61000 |
| PP000009 | 34 | 103042 | Mar. 27, 2021 | TRUE | 6110 | Sales, Retail - Dom. | Fairway Sound | 20,000.00 | Receivables | 61000 |
| PP000009 | 35 | 103042 | Mar. 27, 2021 | TRUE | 5610 | Sales VAT 25% | Fairway Sound | 5,000.00 | Receivables | 61000 |
| PP000009 | 36 | 103042 | Mar. 27, 2021 | TRUE | 6710 | Consulting Fees - Dom. | Fairway Sound | 27,000.00 | Receivables | 61000 |
| PP000009 | 37 | 103042 | Mar. 27, 2021 | TRUE | 5611 | Sales VAT 10% | Fairway Sound | 2,700.00 | Receivables | 61000 |
| PP000009 | 38 | 103043 | Mar. 27, 2021 | TRUE | 6810 | Fees and Charges Rec. - Dom. | Fairway Sound | 2,100.00 | Receivables | 61000 |
| PP000009 | 39 | 103043 | Mar. 27, 2021 | TRUE | 5610 | Sales VAT 25% | Fairway Sound | 525.00 | Receivables | 61000 |
| PP000009 | 40 | | Mar. 27, 2021 | TRUE | 2310 | Customers Domestic | Fairway Sound | −57,325.99 | Receivables | 61000 |

The computerized database stores data for the cash basis accounts which are separate and distinct from the accrual basis accounts in the general ledger entries shown in the following table.

| Posting Date | Document Type | Document No. | Customer No. | Description | Original Amount | Amount | Remaining Amount |
|---|---|---|---|---|---|---|---|
| Jan. 4, 2020 | Invoice | 103040 | 10000 | Invoice 1018 | 30,800.00 | 30,800.00 | 0.00 |
| Jan. 15, 2020 | Payment | PP000003 | 10000 | Customer 10 | −30,800.00 | −30,800.00 | 0.00 |
| Jan. 19, 2020 | Invoice | 103041 | 44171511 | Invoice 1019 | 18,670.25 | 18,670.25 | 0.00 |
| Jan. 22, 2020 | Payment | PP000004 | 20000 | Customer 20 | −50,000.00 | −50,000.00 | −50,000,00 |
| Feb. 12, 2020 | Payment | PP000006 | 44171511 | Customer 44 | −18,670.25 | −18,670.25 | 0.00 |
| Mar. 9, 2021 | Invoice | 103042 | 61000 | Invoice 1020 | 54,700.00 | 54,700.00 | 0.00 |
| Mar. 15, 2021 | Invoice | 103043 | 61000 | Invoice 1021 | 5,625.00 | 5,625.00 | 3,000.00 |
| Mar. 22, 2021 | Payment | PP000009 | 61000 | Fairway Sound | −70,000.00 | −70,000.00 | −12,675.00 |

-continued

| | Posting Date | Due Date | Open | On Held | Entry No. | Amount (LCY) | Remaining Amt. (LCY) |
|---|---|---|---|---|---|---|---|
| | Jan. 4, 2020 | Feb. 4, 2020 | FALSE | | 32 | 30,800.00 | 0.00 |
| | Jan. 15, 2020 | Jan. 15, 2020 | FALSE | | 34 | −30,800.00 | 0.00 |
| | Jan. 19, 2020 | Feb. 2, 2020 | FALSE | | 51 | 18,670.25 | 0.00 |
| | Jan. 22, 2020 | Jan. 22, 2020 | TRUE | | 36 | −50,000.00 | −50,000.00 |
| | Feb. 12, 2020 | Feb. 12, 2020 | FALSE | | 53 | −18,670.25 | 0.00 |
| | Mar. 9, 2021 | Apr. 9, 2021 | FALSE | | 81 | 54,700.00 | 0.00 |
| | Mar. 15, 2021 | Apr. 15, 2021 | TRUE | | 84 | 5,625.00 | 3,000.00 |
| | Mar. 22, 2021 | Mar. 27, 2021 | TRUE | | 86 | −70,000.00 | −12,675.00 |

The CFS by the Direct Method may be derived by the system 100 from the cash flow ledger entries. The CFS by Direct Method is shown in the following table. The cash flow is summarized into operating, investing and financing sections as is required for GAAP. Other cash flow statements may be generated by system 100, e.g., to meet management or investor requirements.

| Cash Flow Details | Sum of Amount (LCY) |
|---|---|
| Cash Collections from Customers | 164,015.70 |
| Sales, Retail - Dom. | 34,936.20 |
| Consulting Fees - Dom. | 49,545.45 |
| Fees and Charges Rec. - Dom. | 2,100.00 |
| Sales VAT 10% | 5,500.00 |
| Sales VAT 25% | 9,259.05 |
| Customers Domestic (Unallocated Receipts) | 62,675.00 |
| Cash Payment to Suppliers | (33,065.45) |
| Purch., Retail - Dom. | (6,544.83) |
| Repairs and Maintenance | (9,671.17) |
| Purchase VAT 10% | (545.45) |
| Purchase VAT 25% | (10,604.00) |
| Vendors, Domestic (Unallocated Payments) | (5,700.00) |
| Investing Cash Flow | (26,200.00) |
| Increases during the Year | (26,200.00) |
| Financing Cash Flow | 943,000.00 |
| Capital Stock | 1,000,000.00 |
| Retained Earnings | (57,000.00) |
| Net Cash Flow for the Period | 1,047,750.25 |

The following table is an example of the chart of general ledger accounts.

| No. | Name | Income/ Balance | Account Type | Totaling | Account Category |
|---|---|---|---|---|---|
| 10000 | Suspense Accounts | Balance Sheet | Posting | | |
| 1002 | ASSETS | Balance Sheet | Begin-Total | | Assets |
| 1003 | Fixed Assets | Balance Sheet | Begin-Total | | Assets |
| 1005 | Tangible Fixed Assets | Balance Sheet | Begin-Total | | Assets |
| 1100 | Land and Buildings | Balance Sheet | Begin-Total | | Assets |
| 1110 | Land and Buildings | Balance Sheet | Posting | | Assets |
| 1120 | Increases during the Year | Balance Sheet | Posting | | Assets |
| 1130 | Decreases during the Year | Balance Sheet | Posting | | Assets |
| 1140 | Accum. Depreciation, Buildings | Balance Sheet | Posting | | Assets |
| 1190 | Land and Buildings, Total | Balance Sheet | End-Total | 1100 . . . 1190 | Assets |
| 1200 | Operating Equipment | Balance Sheet | Begin-Total | | Assets |
| 1210 | Operating Equipment | Balance Sheet | Posting | | Assets |
| 1220 | Increases during the Year | Balance Sheet | Posting | | Assets |
| 1230 | Decreases during the Year | Balance Sheet | Posting | | Assets |
| 1240 | Accum. Depr., Oper. Equip. | Balance Sheet | Posting | | Assets |
| 1290 | Operating Equipment, Total | Balance Sheet | End-Total | 1200 . . . 1290 | Assets |
| 1300 | Vehicles | Balance Sheet | Begin-Total | | Assets |
| 1310 | Vehicles | Balance Sheet | Posting | | Assets |
| 1320 | Increases during the Year | Balance Sheet | Posting | | Assets |
| 1330 | Decreases during the Year | Balance Sheet | Posting | | Assets |
| 1340 | Accum. Depreciation, Vehicles | Balance Sheet | Posting | | Assets |
| 1390 | Vehicles, Total | Balance Sheet | End-Total | 1300 . . . 1390 | Assets |
| 1395 | Tangible Fixed Assets, Total | Balance Sheet | End-Total | 1005 . . . 1395 | Assets |
| 1999 | Fixed Assets, Total | Balance Sheet | End-Total | 1003 . . . 1999 | Assets |
| 2000 | Current Assets | Balance Sheet | Begin-Total | | Assets |
| 2100 | Inventory | Balance Sheet | Begin-Total | | Assets |
| 2110 | Resale Items | Balance Sheet | Posting | | Assets |
| 2111 | Resale Items (Interim) | Balance Sheet | Posting | | Assets |
| 2112 | Cost of Resale Sold (Interim) | Balance Sheet | Posting | | Assets |
| 2120 | Finished Goods | Balance Sheet | Posting | | Assets |
| 2121 | Finished Goods (Interim) | Balance Sheet | Posting | | Assets |
| 2130 | Raw Materials | Balance Sheet | Posting | | Assets |
| 2131 | Raw Materials (Interim) | Balance Sheet | Posting | | Assets |
| 2132 | Cost of Raw Mat. Sold (Interim) | Balance Sheet | Posting | | Assets |
| 2140 | WIP Account, Finished goods | Balance Sheet | Posting | | Assets |
| 2180 | Primo Inventory | Balance Sheet | Posting | | Assets |
| 2190 | Inventory, Total | Balance Sheet | End-Total | 2100 . . . 2190 | Assets |
| 2200 | Job WIP | Balance Sheet | Begin-Total | | Assets |

-continued

| No. | Name | Income/ Balance | Account Type | Totaling | Account Category |
|---|---|---|---|---|---|
| 2210 | WIP Sales | Balance Sheet | Begin-Total | | Assets |
| 2211 | WIP Job Sales | Balance Sheet | Posting | | Assets |
| 2212 | Invoiced Job Sales | Balance Sheet | Posting | | Assets |
| 2220 | WIP Sales, Total | Balance Sheet | End-Total | 2210 . . . 2220 | Assets |
| 2230 | WIP Costs | Balance Sheet | Begin-Total | | Assets |
| 2231 | WIP Job Costs | Balance Sheet | Posting | | Assets |
| 2232 | Accrued Job Costs | Balance Sheet | Posting | | Assets |
| 2240 | WIP Costs, Total | Balance Sheet | End-Total | 2230 . . . 2240 | Assets |
| 2290 | Job WIP, Total | Balance Sheet | End-Total | 2200 . . . 2290 | Assets |
| 2300 | Accounts Receivable | Balance Sheet | Begin-Total | | Assets |
| 2310 | Customers Domestic | Balance Sheet | Posting | | Assets |
| 2320 | Customers, Foreign | Balance Sheet | Posting | | Assets |
| 2325 | Customers, Intercompany | Balance Sheet | Posting | | Assets |
| 2330 | Accrued Interest | Balance Sheet | Posting | | Assets |
| 2340 | Other Receivables | Balance Sheet | Posting | | Assets |
| 2390 | Accounts Receivable, Total | Balance Sheet | End-Total | 2300 . . . 2390 | Assets |
| 2400 | Purchase Prepayments | Balance Sheet | Begin-Total | | Assets |
| 2410 | Vendor Prepayments VAT 0% | Balance Sheet | Posting | | Assets |
| 2420 | Vendor Prepayments VAT 10% | Balance Sheet | Posting | | Assets |
| 2430 | Vendor Prepayments VAT 25% | Balance Sheet | Posting | | Assets |
| 2440 | Purchase Prepayments, Total | Balance Sheet | End-Total | 2400 . . . 2440 | Assets |
| 2800 | Securities | Balance Sheet | Begin-Total | | Assets |
| 2810 | Bonds | Balance Sheet | Posting | | Assets |
| 2890 | Securities, Total | Balance Sheet | End-Total | 2800 . . . 2890 | Assets |
| 2900 | Liquid Assets | Balance Sheet | Begin-Total | | Assets |
| 2910 | Cash | Balance Sheet | Posting | | Assets |
| 2920 | Bank, LCY | Balance Sheet | Posting | | Assets |
| 2930 | Bank Currencies | Balance Sheet | Posting | | Assets |
| 2940 | Giro Account | Balance Sheet | Posting | | Assets |
| 2990 | Liquid Assets, Total | Balance Sheet | End-Total | 2900 . . . 2990 | Assets |
| 2995 | Current Assets, Total | Balance Sheet | End-Total | 2000 . . . 2995 | Assets |
| 2999 | TOTAL ASSETS | Balance Sheet | End-Total | 1002 . . . 2999 | Assets |
| 3000 | LIABILITIES AND EQUITY | Balance Sheet | Heading | | |
| 3100 | Stockholder's Equity | Balance Sheet | Heading | | Equity |
| 3110 | Capital Stock | Balance Sheet | Posting | | Equity |
| 3120 | Retained Earnings | Balance Sheet | Posting | | Equity |

The following table provides an example of the chart of cash flow accounts. The general ledger chart of accounts is created by the administrator/user of the system and the cash flow chart of accounts reports are automatically generated by the system 100. Any change in the general ledger chart of accounts is automatically represented in the cash flow chart of accounts.

| No. | Name | Account Type | Totaling |
|---|---|---|---|
| 10000 | Suspense Account | Entry | |
| 1002 | ASSETS | Begin-Total | |
| 1003 | Fixed Assets | Begin-Total | |
| 1005 | Tangible Fixed Assets | Begin-Total | |
| 1100 | Land and Buildings | Begin-Total | |
| 1110 | Land and Buildings | Entry | |
| 1120 | Increases during the Year | Entry | |
| 1130 | Decreases during the Year | Entry | |
| 1140 | Accum. Depreciation, Buildings | Entry | |
| 1190 | Land and Buildings, Total | End-Total | 1100 . . . 1190 |
| 1200 | Operating Equipment | Begin-Total | |
| 1210 | Operating Equipment | Entry | |
| 1220 | Increases during the Year | Entry | |
| 1230 | Decreases during the Year | Entry | |
| 1240 | Accum. Depr., Oper. Equip. | Entry | |
| 1290 | Operating Equipment, Total | End-Total | 1200 . . . 1290 |
| 1300 | Vehicles | Begin-Total | |
| 1310 | Vehicles | Entry | |
| 1320 | Increases during the Year | Entry | |
| 1330 | Decreases during the Year | Entry | |
| 1340 | Accum. Depreciation, Vehicles | Entry | |
| 1390 | Vehicles, Total | End-Total | 1300 . . . 1390 |
| 1395 | Tangible Fixed Assets, Total | End-Total | 1005 . . . 1395 |
| 1999 | Fixed Assets, Total | End-Total | 1003 . . . 1999 |

-continued

| No. | Name | Account Type | Totaling |
|---|---|---|---|
| 2000 | Current Assets | Begin-Total | 0002 . . . 2000 |
| 2100 | Inventory | Begin-Total | |
| 2110 | Resale Items | Entry | |
| 2111 | Resale Items (Interim) | Entry | |
| 2112 | Cost of Resale Sold (Interim) | Entry | |
| 2120 | Finished Goods | Entry | |
| 2121 | Finished Goods (Interim) | Entry | |
| 2130 | Raw Materials | Entry | |
| 2131 | Raw Materials (Interim) | Entry | |
| 2132 | Cost of Raw Mat. Sold (Interim) | Entry | |
| 2140 | WIP Account, Finished goods | Entry | |
| 2180 | Primo Inventory | Entry | |
| 2190 | Inventory, Total | End-Total | 2100 . . . 2190 |
| 2200 | Job WIP | Begin-Total | |
| 2210 | WIP Sales | Begin-Total | |
| 2211 | WIP Job Sales | Entry | |
| 2212 | Invoiced Job Sales | Entry | |
| 2220 | WIP Sales, Total | End-Total | 2210 . . . 2220 |
| 2230 | WIP Costs | Begin-Total | |
| 2231 | WIP Job Costs | Entry | |
| 2232 | Accrued Job Costs | Entry | |
| 2240 | WIP Costs, Total | End-Total | 2230 . . . 2240 |
| 2290 | Job WIP, Total | End-Total | 2200 . . . 2290 |
| 2300 | Accounts Receivable | Begin-Total | |
| 2310 | Customers Domestic | Entry | |
| 2320 | Customers, Foreign | Entry | |
| 2325 | Customers, Intercompany | Entry | |
| 2330 | Accrued Interest | Entry | |
| 2340 | Other Receivables | Entry | |
| 2390 | Accounts Receivable, Total | End-Total | 2300 . . . 2390 |
| 2400 | Purchase Prepayments | Begin-Total | |
| 2410 | Vendor Prepayments VAT 0% | Entry | |

-continued

| No. | Name | Account Type | Totaling |
|---|---|---|---|
| 2420 | Vendor Prepayments VAT 10% | Entry | |
| 2430 | Vendor Prepayments VAT 25% | Entry | |
| 2440 | Purchase Prepayments, Total | End-Total | 2400 . . . 2440 |
| 2800 | Securities | Begin-Total | |
| 2810 | Bonds | Entry | |
| 2890 | Securities, Total | End-Total | 2800 . . . 2890 |
| 2900 | Liquid Assets | Begin-Total | |
| 2910 | Cash | Entry | |
| 2920 | Bank, LCY | Entry | |
| 2930 | Bank Currencies | Entry | |
| 2940 | Giro Account | Entry | |
| 2990 | Liquid Assets, Total | End-Total | 2900 . . . 2990 |
| 2995 | Current Assets, Total | End-Total | 2000 . . . 2995 |
| 2999 | TOTAL ASSETS | End-Total | 1002 . . . 2999 |
| 3000 | LIABILITIES AND EQUITY | Heading | |
| 3100 | Stockholder's Equity | Heading | |
| 3110 | Capital Stock | Entry | |

FIGS. 8-10 summarize the sub-processes depicted in and described by FIGS. 3-5.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

One should appreciate that the systems and methods described herein may provide different example technical effects and solutions e.g. better memory usage, improved processing, improved bandwidth usage, reduced errors, and auditable data. Further, the system 100 can use the new database 38 to implement the CFS by direct method which is an easier to understand process that improves fraud detection, better forecasts of future cash flows, and enables better management planning. The new database 38 is independent of the income statement and balance sheet. The system 100 can efficiently, quickly and automatically generate the new database 38 by reading, extracting, and modifying data without manual intervention. The system 100 generates the database 38 storing accurate data that is auditable and can be tracked. The system 100 requires a hardware processor 20 and memory 30 (storing instructions 42) given the high volume of transaction data. Further, the hardware processor 20 executes the instructions 42 for complex calculations to generate the CF ledger entries for the database 38. Reversal entries can trigger immediate and automatic erasure of CF ledger entries by the processor 20. Further, a change in application of receipt or payment require recalculations by the processor 20. The system 100 can track allocation of multiple invoices for each receipt or payment. The processor 20 can execute updated instructions to implement changing rules.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only. The scope is indicated by the appended claims.

What is claimed is:

1. A system, comprising:

a non-transitory memory storing instructions, the non-transitory memory further configured to store general ledger entries; and a hardware processor for generation and storage of a computerized cash flow ledger entries database comprising derived data relating to cash flow, the hardware processor further configured for automatic retrieval and visualizations of the derived cash flow data from the computerized cash flow ledger entries database to implement a statement of cash flows by a direct method to reduce use of computational resources by obviating a need to maintain cash accounts in the memory, the hardware processor configured to:

identify documents and datasets from the general ledger entries comprising entries relating to cash accounts;

automatically extract the cash related entries from the general ledger entries;

transform the extracted cash related entries from the general ledger entries to a form of data suitable for cash basis accounting;

identify a receipt or payment entry and a corresponding applied invoice entry within the general ledger entries, and combine said entries to create an additional cash flow ledger entry;

generate cash flow ledger entries from the transformed extracted cash related entries;

store the cash flow ledger entries into the computerized cash flow ledger entries database, wherein the computerized cash flow ledger entries database contains only data relating to cash transactions without maintaining duplicate accrual basis accounts; and generate reports comprising the statement of cash flows by the direct method using the computerized cash flow ledger entries database, wherein the statement of cash flows by the direct method includes detailed gross cash flow information, receipts, and payments that are not provided in statements of cash flows by indirect methods; and a client device having an interface to provide the visualizations of data from the computerized cash flow ledger entries database implementing the statement of cash flows by the direct process method and to transmit data to the hardware processor to update the visualization.

2. The system of claim 1, wherein the memory is further configured to store customer ledger entries and vendor ledger entries, and wherein the hardware processor is further configured to:

create additional cash flow ledger entries by extracting and modifying data from the customer ledger entries, the vendor ledger entries, and the general ledger entries; and populate the computerized cash flow ledger Cash Flow Ledger entries database with the additional cash flow ledger Cash Flow Ledger entries.

3. The system of claim 2, wherein the hardware processor updates the visualizations of data from the computerized cash flow ledger entries database based on the populated the computerized cash flow ledger Cash Flow Ledger entries database.

4. The system of claim 1, wherein the non-transitory memory is further configured to store accrual method accounts and the hardware processor is further configured to derive cash accounts based on the accrual method accounts and the computerized cash flow ledger entries database to further reduce use of computational resources by obviating the need to maintain cash accounts in the memory.

5. The system of claim 4, wherein the hardware processor derives the cash accounts based on the accrual method accounts by storing only accrual method accounts in the memory and not cash accounts in the memory.

6. The system of claim 1, wherein the hardware processor is further configured to modify computerized cash flow ledger entries database to create a new computerized database containing only data relating to cash transactions comprises maintaining a record of modification of each database source to maintain a traceability of data comprising each database to provide enhanced data security.

7. A method, comprising:

storing general ledger entries in a memory; and using a hardware processor for generation and storage of a computerized cash flow ledger entries database comprising derived data relating to cash flow, further for automatic retrieval and visualizations of the derived cash flow data from the computerized cash flow ledger entries database to implement a statement of cash flows by a direct method to reduce use of computational resources by obviating a need to maintain cash accounts in a non transitory non-transitory memory, the hardware processor further configured for:

identifying documents and datasets from the general ledger entries comprising entries relating to cash accounts;

automatically extracting the cash related entries from the general ledger entries;

transforming the extracted cash related entries from the general ledger entries to a form of data suitable for cash basis accounting;

identifying a receipt or payment entry and a corresponding applied invoice entry within the general ledger entries, and combining said entries to create an additional cash flow ledger entry;

generating cash flow ledger entries from the transformed extracted cash related entries;

storing the cash flow ledger entries into the computerized cash flow ledger entries database, wherein the computerized cash flow ledger entries database contains only data relating to cash transactions without maintaining duplicate accrual basis accounts; and generating reports comprising the statement of cash flows by the direct method using the computerized cash flow ledger entries database, wherein the statement of cash flows by the direct method includes detailed gross cash flow information, receipts, and payments that are not provided in statements of cash flows by indirect methods.

8. The method of claim 7, further comprising using a client device having an interface to provide the visualizations of data from the computerized cash flow ledger entries database implementing the statement of cash flows by the direct method and to transmit data to the hardware processor to update the visualization visualizations.

9. The method of claim 7, further comprising:

storing customer ledger entries and vendor ledger entries in the memory;

using the hardware processor to create additional cash flow ledger entries by extracting and modifying data from the customer ledger entries, the vendor ledger entries, and the general ledger entries; and using the hardware processor to populate the computerized cash flow ledger entries database with the additional cash flow ledger entries.

10. The method of claim 7, further comprising:

storing accrual method accounts in a memory of a computer system; and deriving cash accounts based on the accrual method accounts and the computerized cash flow ledger entries database to further reduce use of computational resources by obviating maintaining cash accounts in the memory.

11. The method of claim 8, wherein deriving the cash accounts based on accrual method accounts comprises storing only accrual method accounts in the non-transitory memory and not cash accounts in the memory.

12. The method of claim 7, wherein the hardware processor is further configured for:

modifying the databases to create the computerized cash flow ledger entries database containing only data relating to cash transactions, wherein modifying comprises maintaining a record of modification of each database to maintain a traceability of data comprising each database to provide enhanced data security.

13. A system, for electrical computers, digital processing, and visual display, the system comprising:

a non-transitory memory storing instructions, the non-transitory memory further configured to store general ledger entries; and a hardware processor for modifying databases to create a new computerized database containing only data relating to cash transactions, wherein the new computerized database is accessible by a client device having an interface and a cloud server to produce different cash accounting reports, including a statement of cash flows by a direct method, the hardware processor configured to:

identify documents and datasets from the general ledger entries comprising entries relating to cash accounts;

automatically extract the cash related entries from the general ledger entries;

transform the extracted cash related entries from the general ledger entries to a form of data suitable for cash basis accounting;

identify a receipt or payment entry and a corresponding applied invoice entry within the general ledger entries, and combine said entries to create an additional cash flow ledger entry;

generate cash flow ledger entries from the transformed extracted cash related entries;

store the cash flow ledger entries into the new computerized database, wherein the new computerized database contains only data relating to cash transactions without maintaining duplicate accrual basis accounts; and generate reports comprising the statement of cash flows by the direct method using the new computerized database, wherein the statement of cash flows by the direct method includes detailed gross cash flow information, receipts, and payments that are not provided in statements of cash flows by indirect methods.

14. A method, for electrical computers, digital processing, and visual display, the method comprising:

storing general ledger entries in a memory;

identifying documents and datasets from the general ledger entries comprising entries relating to cash accounts;

automatically extracting the cash related entries from the general ledger entries;

transforming the extracted cash related entries from the general ledger entries to a form of data suitable for cash basis accounting;

identifying a receipt or payment entry and a corresponding applied invoice entry within the general ledger entries, and combining said entries to create an additional cash flow ledger entry;

generating cash flow ledger entries from the transformed extracted cash related entries;

storing the cash flow ledger entries into a new computerized database, wherein the new computerized database contains only data relating to cash transactions without maintaining duplicate accrual basis accounts; and generating reports comprising a statement of cash flows by a direct method using the new computerized database, wherein the statement of cash flows by the direct method includes detailed gross cash flow information, receipts, and payments that are not provided in statements of cash flows by indirect methods;

modifying databases to create the new computerized database containing only data relating to cash transactions, wherein the new computerized database is accessible by a client device having an interface and a cloud server to produce different cash accounting reports, including the statement of cash flows by the direct method.

15. The method of claim 14, further comprising:

storing accrual method accounts in a memory of a computer system; and deriving cash accounts based on the accrual method accounts and the new computerized database to reduce use of computational resources by obviating a need to maintain cash accounts in the memory.

16. The method of claim 15, wherein deriving the cash accounts based on the accrual method accounts comprises storing only accrual method accounts in the memory and not cash accounts in the memory.

17. The method of claim 14, wherein modifying the databases to create the new computerized database containing only data relating to cash transactions comprises maintaining a record of modification of each database to maintain a traceability of data comprising each database to provide enhanced data security.

18. The method of claim 14, further comprising generating visualizations of data from the new computerized database and providing the visualizations for display at the interface of the client device.

* * * * *